(12) United States Patent
Howland

(10) Patent No.: US 8,809,210 B2
(45) Date of Patent: Aug. 19, 2014

(54) LOW ROUGHNESS HIGH SURFACE-ENERGY, ANTI-MICROBIAL FABRIC

(75) Inventor: Charles A Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 0 days.

(21) Appl. No.: 13/507,432

(22) Filed: Jun. 28, 2012

(65) Prior Publication Data

US 2012/0295063 A1 Nov. 22, 2012

Related U.S. Application Data

(63) Continuation-in-part of application No. 12/986,252, filed on Jan. 7, 2011, which is a continuation-in-part of application No. PCT/US2010/057477, filed on Nov. 19, 2010, application No. 13/507,432, which is a continuation-in-part of application No. 13/468,295, filed on May 10, 2012, which is a continuation of application No. PCT/US2010/057477.

(60) Provisional application No. 61/503,985, filed on Jul. 1, 2011, provisional application No. 61/262,949, filed on Nov. 20, 2009, provisional application No. 61/310,389, filed on Mar. 4, 2010, provisional application No. 61/354,588, filed on Jun. 14, 2010, provisional application No. 61/370,529, filed on Aug. 4, 2010, provisional application No. 61/293,791, filed on Jan. 11, 2010.

(51) Int. Cl.
*B05D 1/28* (2006.01)
*A01N 25/00* (2006.01)

(52) U.S. Cl.
USPC ........... 442/123; 424/402; 424/404; 424/405; 427/428.01

(58) Field of Classification Search
USPC ................. 442/133, 123; 424/404, 405, 402; 427/428.01
See application file for complete search history.

(56) References Cited

U.S. PATENT DOCUMENTS 5,665,810 A 9/1997 Patchett et al.
5,882,357 A * 3/1999 Sun et al. ........................ 8/189

(Continued)

FOREIGN PATENT DOCUMENTS

WO 2004044305 A1 5/2004

OTHER PUBLICATIONS

PCT Search Report for PCT Application No. PCT/US2010/057477, Aug. 28, 2011, 2 pages.

(Continued)

*Primary Examiner* — Matthew Matzek
(74) *Attorney, Agent, or Firm* — Maine Cernota & Rardin

(57) ABSTRACT

A self-decontaminating fabric is manufactured from fibers such as Tencel having high surface energy and low surface roughness. Novel scouring methods eliminate substantially all contaminants from the fibers, and a novel coating process applies an anti-pathogen coating such as a halogen compound to the fabric so as to provide rapid deactivation of pathogens on contact. Novel charging methods activate or reactivate the coating, typically by exposure to chlorine. The coating is substantially free of gap regions where pathogens can survive. The high surface energy of the fibers allows a high coating concentration and provides close contact between attached pathogens and the coating. The low surface roughness reduces the pickup of pathogens by the fibers. Multilayer embodiments include an outer layer configured for maximum anti-pathogen coating concentration, and an inner layer configured for a reduced coating concentration that is compatible with skin contact.

41 Claims, 11 Drawing Sheets
(5 of 11 Drawing Sheet(s) Filed in Color)

(56) References Cited

U.S. PATENT DOCUMENTS

| | | | |
|---|---|---|---|
| 5,959,014 A * | 9/1999 | Liebeskind et al. | 524/389 |
| 6,077,319 A | 6/2000 | Sun et al. | |
| 6,770,287 B1 | 8/2004 | Sun et al. | |
| 7,858,539 B2 | 12/2010 | Li et al. | |
| 2001/0055651 A1 | 12/2001 | Mao et al. | |
| 2002/0018794 A1* | 2/2002 | Goto et al. | 424/404 |
| 2002/0090872 A1 | 7/2002 | Li | |
| 2003/0159200 A1 | 8/2003 | Elrod | |
| 2004/0137818 A1* | 7/2004 | Kimbrell et al. | 442/211 |
| 2005/0229327 A1 | 10/2005 | Casella et al. | |
| 2008/0104738 A1 | 5/2008 | Conley et al. | |
| 2009/0148637 A1 | 6/2009 | Zhang et al. | |
| 2010/0088827 A1 | 4/2010 | Knott et al. | |

OTHER PUBLICATIONS

Sun, Gang—National Textile Center, National Textile Center Annual Report: NTC Project C02-CD06 (formerly C02-E06), Nov. 2003, 6 pages.

Sun, G., Xu X., Bickett J. R., Williams J.F., (2001) "Durable and Regenerable Antimicrobial Finishing of Fabrics with a New Hydantoin Derivative," Ind. Eng. Chem. Res., vol. 40, 1016-1021.

Sun, G., Xu, X., "Durable and Regenerable Antibacterial Finishing of Fabrics: Biocidal Properties," Text. Chem. Color. 1998, 30 (6), 26-30.

Sun, G., Xu, X., "Durable and Regenerable Antibacterial Finishing of Fabrics: Chemical Structures," Text. Chem. Color. 1999, 31 (5), 31-35.

Williams, Jeffrey F. et al., Antimicrobial Functionality of Healthcare textiles: Current needs, Options, and Characterization of N halamine-Based Finishes, RJTA Vo. 10, No. 4, 2006, 12 pages.

PCT Search Report and Written Opinion for PCT Application No. PCT/US2012/000301, Feb. 5, 2013, 8 pages.

Declaration of Dr. Gang Sun under 37 CFR 1.132 made in U.S. Appl. No. 09/596,808, dated Apr. 15, 2003, 10 pages.

Barnes, K. et al., Modification of Silica Gel, Cellulose, and Polyurethane with a Sterically Hindered N-Halamine Moiety to Produce Antimicrobial Activity, Journal of Applied Polymer Science, vol. 105, 2306-2313, 2007, 8 pages.

Sun, Y. et al., Durable and Regenerable Antimicrobial Textile Materials Prepared by a Continuous Grafting Process, Journal of Applied Polymer Science, vol. 84, 1592-1599, 2002, 8 pages.

* cited by examiner

LOW ROUGHNESS HIGH SURFACE-ENERGY, ANTI-MICROBIAL FABRIC

RELATED APPLICATIONS

This application is a continuation in part of U.S. application Ser. No. 12/986,252 filed on Jan. 7, 2011, which is a continuation in part of PCT application PCT/US2010/057477 filed on Nov. 19, 2010, which claims the benefit of U.S. Provisional Application Nos. 61/262,949, filed Nov. 20, 2009, 61/310,389 filed Mar. 4, 2010, 61/354,588 filed Jun. 14, 2010, and 61/370,529 filed Aug. 4, 2010. Application Ser. No. 12/986,252 also claims the benefit of U.S. Provisional Application No. 61/293,791, filed Jan. 11, 2010. This application is also a continuation in part of U.S. application Ser. No. 13/468,295 filed on May 10, 2012, which is a continuation of application PCT/US2010/057477 filed on Nov. 9, 2010, which claims the benefit of U.S. Provisional Application Nos. 61/262,949, filed Nov. 20, 2009, 61/310,389 filed Mar. 4, 2010, 61/354,588 filed Jun. 14, 2010, and 61/370,529 filed Aug. 4, 2010. This application also claims the benefit of U.S. Provisional Application No. 61/503,985, filed Jul. 1, 2011. All of these applications are incorporated herein by reference in their entirety for all purposes.

STATEMENT OF GOVERNMENT INTEREST

Portions of the present invention may have been made in conjunction with Government funding under "NSF Grant No. IIP-1047008", and there may be certain rights to the Government.

FIELD OF THE INVENTION

The invention relates to protective fabrics, and more particularly, to fabrics which are able to neutralize pathogens on contact.

BACKGROUND OF THE INVENTION

Drug-resistant pathogens represent a significant public health problem which can affect individuals at work, at home, and even in the hospital. After 60 years of sometimes indiscriminant antibiotic use, Methicillin-Resistant *Staphylococcus Aureus* (MRSA), Vancomycin-Resistant *Staphylococcus Aureus* (VRSA), *Clostridium difficile* (*C. difficile*), and other gram negative pathogens are currently circumventing our traditional approaches to pathogen control, and challenging our capacity to innovate new technical solutions.

In Feb. 10, 2010, Reuters reported that the estimated cost of infections acquired at hospitals alone is $8.1 billion. From a study published in *Archives of Internal Medicine* that same day, Reuters reported finds by researchers that pneumonia patients stayed an extra 14 days after surgery, and that more than 11 percent of them died. "That's the tragedy of such cases," said Anup Malani of the University of Chicago, who worked on the study. "In some cases, relatively healthy people check into the hospital for routine surgery. They develop sepsis because of a lapse in infection control, and they can die." The researchers said that 1.7 million healthcare-associated infections are diagnosed every year. Many are due to drug-resistant bacteria, such as Methicillin Resistant *Staphylococcus Aureus* or MRSA, which cost more to treat because only a few drugs can work against them. These infections can also be caught outside hospitals, and some studies show that such community-acquired infections are also on the rise. One estimate from Pfizer Inc. suggested that treating MRSA alone costs $4 billion a year.

As human density and high speed transport of people and food products has become the norm, newly evolved pathogen types can be spread widely and result in major public health issues. One of the ways that drug-resistant pathogens can be spread is by cross-contamination, also referred to herein as "contact transfer," whereby the pathogens contaminate the skin and/or clothing of an individual, and then are transferred from one individual to another through personal contact. The risk of cross-contamination is especially great in public and institutional settings where workers interact with the general public. Examples include hospital emergency departments, hospital infectious disease care units, general hospital environments, long-term healthcare facilities, correctional facilities, transportation screening (such as TSA transport screening), some athletic facilities, law enforcement, corrections, toll booth attendants, theater ticket takers, and EMT and fire services. Many of these facilities have already suffered serious outbreaks of infection, and know from experience that these pathogens can be difficult to control.

Attempts to avoid cross-contamination typically include a complete range of hand hygiene protocols, including hand washing and/or gelling and use of barrier gloves and/or other personal protection equipment ("PPE"). Personal protection equipment ("PPE") such as masks and gloves, gowns, and other protective clothing that can be changed and laundered frequently is often used to protect an individual from exposure to dangerous pathogens, for example in a medical environment, or when investigating a toxic biological spill. Other examples include police, prison guards, custodial personnel, security personnel at airports and other secure installations, toll collectors on roadways, and ticket takers at theaters.

In particular, protective disposable gloves are often worn under such conditions. In these approaches, workers must be trained to be diligent in using the gloves and other protective clothing, and to change them frequently. It is well understood that the key to control of contact transfer is active compliance with these protocols.

However, these hygiene protocols can lead to considerable cost and waste, as well as loss of valuable time as the user is forced to repeatedly stop whatever he or she is doing so as to sterilize or exchange gloves and/or other PPE. In practice, a user may be tempted to minimize compliance with required glove-sterilizing and/or glove-changing procedures, or may occasionally forget to sterilize or change gloves, for example due to being absorbed in performing other duties. Unfortunately, in healthcare settings, management has already learned that procedural controls are not enough. People make too many small procedural errors to rely on this approach exclusively. And in many settings, such as toll and ticket takers, frequent changing of gloves is simply not practical.

In addition, frequent changing of protective gloves can cause contamination of the user, due to handling of used contaminated gloves. If the user fails to properly sterilize his or her hands after removal of contaminated gloves, the user can become infected. Since hand sterilization is typically carried out using an alcohol-based substance, protection from such sterilization does not persist from one glove change to the next, so that even a single failure to properly sterilize hands during a change of gloves can lead to dangerous results.

Also, because non-disposable gloves are typically sterilized by applying an alcohol-based product to the outer surfaces of the gloves, and because these sterilizing products evaporate quickly, this approach to glove sterilization does not provide any protection against cross-contamination between sterilizations.

One approach is to sterilize the user's hands between glove changes with a persistent sterilizing cream, such as a hand cream containing Triclosan, which can provide some back-up protection in case the user's hands are not properly sterilized during a subsequent glove change. However, such a cream may interfere with use of the gloves. Also, abrasion by the glove itself can tend to wear the cream away. In addition, this approach provides no added protection against cross-contamination of others if the gloves are not sterilized and/or changed with sufficient frequency.

Efforts to avoid cross-contamination could be much more successful if workers could wear gloves, gowns, and/or other protective garments which were self-decontaminating, and therefore did not need to be changed as often as standard protective garments, and/or could continue to provide protection against cross-contamination even if a busy doctor or nurse, for example, occasionally forgot to change his or her gloves between patients. Many personnel from hospitals, transport security, police, corrections, and other public services typically move from one subject to the next within 30-180 seconds. Therefore, for a self-decontaminating fabric to be effective, it must be able to destroy a wide range of pathogens on its outer surface to a 3-log kill level within 30-180 seconds.

A number of self-decontaminating fabrics are currently on the market, utilizing copper, silver, or hydantoin-attached chloramine. However, for these fabrics the 3-log kill rates for vegetative pathogens are in the range of 1-24 hours, and many, if not most, of these current offerings have little or no affect on endospores such as *C. difficile*. Therefore, while these fabrics may be useful for other purposes, they are not effective for cross contamination control.

A number of other self-decontaminating fabric technologies have been under development for many years, and some of them have been commercialized, including silver coatings and other metal compounds, phenols, chitosan and PHMB to name a few. However, none of these fabrics can provide a sufficiently fast kill time, all have declining performance after washing and use, and none are rechargeable.

Note that the teachings herein are applicable to a variety of types of PPE equipment, such as masks and even complete protection suits, and that the term "glove" is used generically herein to refer to all such PPE equipment, except where the context specifically requires a hand-worn glove.

What is needed, therefore, is a self-decontaminating fabric from which protective gloves and other garments can be made, whereby the fabric provides persistent protection against cross-contamination and user contamination, preferably having a 3-log pathogen kill rate of between 30 and 180 seconds, and whereby the fabric is easily recharged for continued, long-term use.

SUMMARY OF THE INVENTION

A self-decontaminating fabric is manufactured from fibers having high surface energy and low surface roughness. Substantially all contaminants are eliminated from the fibers, after which an anti-pathogen coating is attached through non-covalent hydrogen bonding or Van der Waals forces so as to provide rapid deactivation of pathogens on contact. The low surface roughness reduces the tendency of pathogens to attach to the fibers. The high surface energy enables coating of the anti-pathogen compound at a high concentration, and also causes any attached pathogens to be held in close contact with the anti-pathogen compound for rapid deactivation of the pathogens even in the absence of moisture. The elimination of substantially all contaminants from the fibers provides for an anti-pathogen coating having substantially no gaps. Failure to eliminate such gaps would significantly undermine the protection provided by the fabric against cross-contamination.

High Fiber Surface Energy

There is of course a wide range of fibers formed from a large number of organic materials to which anti-pathogen coatings can be applied. The concentration of a coating to a fiber-based material depends in large measure on the interfacial surface tension of the filament-coating pair. If the thermodynamics of this interface is not favorable, wetting of the coating will be inhibited, preventing the intimate contact needed for hydrogen bonding or Van der Waals attachment. As a result, with incomplete wetting, the antimicrobial surface will be incomplete or variable in density.

In addition to the necessity to manage the filament-coating interface, the interactions between biological pathogens and the coating surface are critical to the effectiveness of the antimicrobial system. In the absence of liquid water, the antimicrobial action requires intimate contact between the pathogen cell membrane and the active surface. In general, the more infectious pathogens have superior attachment behavior to skin and mucus membranes.

In embodiments, the substrate of the present invention has a surface energy measured by the Washburn method before coating of about approximately 68 $mJ/m^2$ and a surface energy after coating and charging as measured by the Washburn method of at least 60 $mJ/m^2$.

Coating Defects

Current anti-microbial systems are not able to achieve fast inactivation times for bio-pathogens. A critical need in the management of contact transfer is short inactivation times. The current systems have not been able to achieve short inactivation times because the importance of defects in the coatings was not understood. The insight which contributed to the present invention is as follows: when there are gaps or windows in the coverage of the biocide coating, the antimicrobial activity can be improved on average, however the effective speed of the anti-pathogen is not improved. At the small scale of bacteria, coating defects have a binary effect. Bacteria on active coating regions are inactivated, however even a very high average coating anti-microbial activity does not inactivate bacteria which are located in a widow or gap in the antimicrobial coating on the substrate.

It is true that many anti-pathogens (i.e. antimicrobials) have an inhibition zone (AATCC M147). However, this effect is only seen over long exposure times. For this reason, current antimicrobials have very effective inactivation rates for multi-hour exposure times. However, there is little further improvement in the speed of inactivation if the system relies on both direct contact and inhibition zone effects. Because all current anti-microbial coating methods result in a significant density of coating flaws, their inactivation speeds are limited.

In contrast, having understood the criticality of a full coverage antimicrobial system without gaps or windows, the present invention is able to deliver inactivation times that are a small fraction of the current state of the art, providing a high speed kill system. Furthermore, as a result of this insight into the problem, the inventor was able to realize the benefit of further improvements related to increased surface energy. Because the present invention is based on direct contact between the pathogen and the anti-pathogen, the surface energy can be used to improve the wetting at this interface. Because there is uninterrupted antimicrobial activity on the surface of the fabric, the improvement in wetting and increased contact area provided by the high surface area results in a substantial improvement of the inactivation speed. However, if there were coating defects, a high surface energy and improved pathogen attachment would only result in increased transfer of those pathogens which were attached to the gap regions. Therefore, the realization by the inventor that coating flaws were the source of a problem was an important component to enabling the present invention.

Smoothness

This coating flaw insight also enabled the further improvement which is associated with using fibers that have smooth surfaces. Once the forgoing speed improvements were achieved with cotton and other rough fiber types, the inventor was able to discriminate the effect of surface morphology on pathogen surface loading. Once the fabric is delivering direct contact inactivation, surface morphology can control the pathogen loading. Pathogen transfer rates to the antimicrobial compound are controlled by surface geometry. Lower pathogen transfer improves the inactivation rate.

Scouring-Desizing Process

Contaminates on the surface of fibers prevent the wetting and subsequent adhesion of antimicrobial coatings to the fiber. Therefore, to permit the attachment of coatings of the fiber, the wax, size, lubricants used in processing the fiber, and other contaminates are minimized. There are many continuous desizing processes. In general they consist of multiple dip and pad passes through aqueous baths containing detergent and wetting components. The dip and pad of desizing chemistry, in embodiments applied at low or zero tension, is followed with multiple rinse and pad steps to remove the contaminants solvated by the desizing chemistry. Typically, the level of residual contaminates is less than 1% by weight of the textile.

Coating and Drying Processes

The process engineering for coating fibers and fibrous webs has developed into a large number of distinct subject areas. These include a range of methods including open-width roll-to-roll methods, padding, blade coating, direct and reverse roll coating, slot die, direct extrusion and vapor deposit. Roll-to-roll techniques are not all open width, and include rope coating and jet coating, among others. These continuous process types have a range of features that include limited tension in the cross-machine direction and some constructive manipulation of the fiber bundles. However, the need to transport the web through the process limits the opportunity of these processes to apply compressive mechanical action to the yarn bundles.

Continuing this theme there is a set of non-continuous dying processes which have been developed for yarn hanks, packages, or garments. These batch processes are variable in their process specifics. However, they include some methods that permit constructive mechanical action of the fiber bundles under zero tension during the dying process. Drum and paddle garment-piece dying is unique in this group in permitting both zero tension and compressive mechanical action to the yarn bundles. These batch processes are not used with organic solvent-based baths, but are more than 95% aqueous based.

Multi-Layer Fabric

In embodiments, the present invention can provide a high level of bio-pathogen control without concern about adverse effects on the wearer's skin. These embodiments address the concern by the creation of a fabric having a multi-layer structure, including an outer fiber layer that is capable of accepting an aggressive anti-pathogen coating and producing high pathogen inactivation rates, and an inner layer of fiber that contacts the wearer's skin and is configured to accept a lower intensity anti-microbial coating which is compatible with skin contact.

One general aspect of the present invention is a fiber structure that includes a polymeric substrate fiber layer having a total surface energy greater than 45 mJ/m$^2$, and an antimicrobial coating applied to a surface of the fiber layer, the antimicrobial coating having fewer than 1 coating gap of greater than 1 µm$^2$ in extent per 7 µm$^2$ of coated surface.

In embodiments the antimicrobial coating has no more than 1 coating gap of greater than 1 µm$^2$ per 30 µm$^2$ of coated surface. In some embodiments the antimicrobial coating has no more than 1 coating gap of greater than 1 µm$^2$ per 150 µm$^2$ of coated surface. In other embodiments the antimicrobial coating has a thickness of less than 1.0 microns.

In various embodiments the antimicrobial coating is attached to the surface of the fiber layer by non-covalent attachment including at least one of hydrogen bonding and Van der Waals attachment.

In certain embodiments the fiber layer includes cellulosic filaments. In some of these embodiments the cellulosic filaments are synthetic cellulosic filaments. And in some of these embodiments the synthetic cellulosic filaments include at least one of cotton, nitro-cellulose, viscose, lyocell, and Tencel and at least one other non-celulosic fiber.

In some embodiments the fiber layer includes single yarn bundles of less than 1000 d denier. In other embodiments the fiber layer includes single yarn bundles of less than 300 d denier. And in still other embodiments the fiber layer includes single yarn bundles of less than 200 d denier.

In some embodiments the fiber layer includes yarn bundles with a twist multiple of below 3.9. In other embodiments the fiber layer includes yarn bundles with a twist multiple of below 3.5.

In various embodiments the fiber layer includes yarn bundles having filament percentages in their outer surfaces above 20%. In certain embodiments the fiber layer is constructed with a weave of more than 30 yarns per inch in a machine direction and more than 30 yarns per inch in a cross machine direction.

In some embodiments the fiber layer has an air permeability tested by ASTM D737 of greater than 400 cfm/ft$^2$. In other embodiments the antimicrobial coating has a total coated average 2 dimensional roughness Sa of less than 0.5 of pima cotton.

And in still other embodiments the antimicrobial coating includes at least one type of consumable halogen component having a total pathogen inactivation rating when compared to an animal skin model of greater than 1 log over a contact time of greater than 90 seconds.

Another general aspect of the present invention is a fiber structure that includes a polymeric substrate fiber layer having total surface energy greater than 45 mJ/m$^2$, and a substantially uninterrupted antimicrobial coating attached to a surface of the fiber layer, the antimicrobial coating having a surface energy of greater than 40 mJ/m$^2$, the antimicrobial coating having a total coated average 2 dimensional roughness Sa of less than 0.5 of pima cotton.

In some embodiments, the antimicrobial coating has a total coated average 2 dimensional roughness Sa of less than 0.045 µm. In other embodiments the antimicrobial coating has a total coated average 2 dimensional roughness Sa of less than 0.02 µm.

In certain embodiments the antimicrobial coating is attached to the surface of the fiber layer by non-covalent attachment including at least one of hydrogen bonding and Van der Waals attachment.

In various embodiments the fiber layer includes synthetic cellulosic filaments. And in some of these embodiments the synthetic cellulosic filaments include at least one of cotton, nitro-cellulose, viscose, lyocell, and Tencel and at least one other non-celulosic fiber.

Still another general aspect of the present invention is a fiber structure including a cellulosic fiber layer, and an antimicrobial coating applied to a surface of the fiber layer, the antimicrobial coating including at least one type of consumable halogen component having a total pathogen inactivation rating when compared to an animal skin model of greater than 1 log over a contact time of greater than 90 seconds.

In embodiments, the cellulosic fiber layer has a surface energy measured by the Washburn method before coating of about approximately 68 mJ/m$^2$ and a surface energy after coating and charging as measured by the Washburn method of at least 60 mJ/m$^2$.

In various embodiments the consumable halogen component includes at least one of halamine, a halogen-charged N-cyclic, halogen-charged hydantoin, halogen-charged DMDMH, halogen-charged CMDH, and halogen-charged glycoluril.

In certain embodiments the antimicrobial coating is attached to the surface of the fiber layer by non-covalent attachment including at least one of hydrogen bonding and Van der Waals attachment.

In some embodiments the consumable halogen component is chargable to a halogen charge of at least 4000 ppm. In other embodiments the consumable halogen component is chargable to a halogen charge of at least 5000 ppm. And in still other embodiments the consumable halogen component is chargable to a halogen charge of at least 6000 ppm.

In various embodiments the antimicrobial coating is capable of inactivating at least 97% of a transferred biopathogen in 90 seconds as measured using the contact transfer test protocol (CTTP).

In certain embodiments the fiber structure is a multi-layer structure further including an inward facing polymeric substrate layer, and an inner antimicrobial layer attached to a surface of the inward facing polymeric substrate layer, the inner antimicrobial layer being compatible with long term skin contact.

And in some of these embodiments the inner anti-microbial layer includes a consumable halogen component that is chargeable with a halogen to a charge of no more than 600 ppm.

Yet another general aspect of the present invention is a method for producing a fabric structure including a polymeric substrate fiber layer having a total surface energy greater than 45 mJ/m$^2$ and an antimicrobial coating applied to a surface of the fiber layer, the antimicrobial coating having fewer than 1 coating gap of greater than 1 μm$^2$ in extent per 7 μm$^2$ of coated surface. The method includes forming yarn bundles of less than 1000 d denier, the yarn bundles being bundles of synthetic cellulosic filaments with twist multiples of less than 3.9, scouring the yarn bundles at zero tension with applied agitation, drying the yarn bundles using a non-continuous drying method at zero tension with applied agitation, constructing a fiber layer from the dried yarn bundles with more than 30 yarns per inch in a machine direction and more than 30 yarns per inch in a cross machine direction, and applying the anti-microbial coating to the fiber layer using a non-continuous batch process at zero fabric tension.

In embodiments, the method further includes desizing the yarn bundles using multiple dip and pad passes through aqueous baths containing detergent and wetting components, followed by multiple rinse and pad steps to remove the contaminants solvated by the desizing chemistry.

In various embodiments the level of residual contaminants after desizing and rinsing is less than 1% by weight of the textile.

In some embodiments the antimicrobial coating is applied using a drum and paddle method that applies both zero tension and compressive mechanical action to the fiber layer. In other embodiments the antimicrobial coating is applied using a non-continuous coating process with greater than 10 minutes exposure.

In various embodiments the antimicrobial coating is applied using jet processing with between 50 and 100 g's of rotational acceleration while a coating liquor is sprayed onto the surface of the fiber layer.

And in certain embodiments the antimicrobial coating is attached to the surface of the fiber layer by non-covalent attachment including at least one of hydrogen bonding and Van der Waals attachment.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention, in embodiments, is an antimicrobial coated fabric structure which uses both interface control mechanisms and anti-pathogen inactivation of the bio-pathogen to control cross contamination, also referred to herein as contact transfer. The invention controls surface energy vectors of the coated fabric surface to enhance hydrogen bonding and/or Van der Waals attachment of the pathogen. In addition, the total pickup rate of pathogens is controlled by controlling the surface roughness of the substrate.

The operating mechanism of the present invention is as follows. The smoothness of the fiber surfaces limits the pickup of pathogens. The high surface energy of the fibers ensures that pathogens which are picked up will be well attached, and will be less likely to be sloughed off, and therefore less likely to result in contact transmission. The high surface energy of the fibers also ensures that attached pathogens will have increased contact area with the biocide, and will therefore be more likely to be inactivated at high rates.

The present invention is based on a combination of novel elements, including selection of fibers having high surface area and high smoothness, a novel scour process for the preparation of the fabric surface, which in embodiments is a chemically clean, OH-functionalized cellulosic surface, and a novel coating process that achieves a very complete coverage of the filament surface, high pick up, and complete penetration of the fiber bundle, providing durable attachment through non-covalent hydrogen bonding and/or Van der Waals forces. This coating provides for consistent coverage of anti-pathogen, which in embodiments is a halogen-based biocide on the substrate surface such as halamine or a halogen-charged version of an N-cyclic, hydantoin, or DMDMH.

Figure 1:
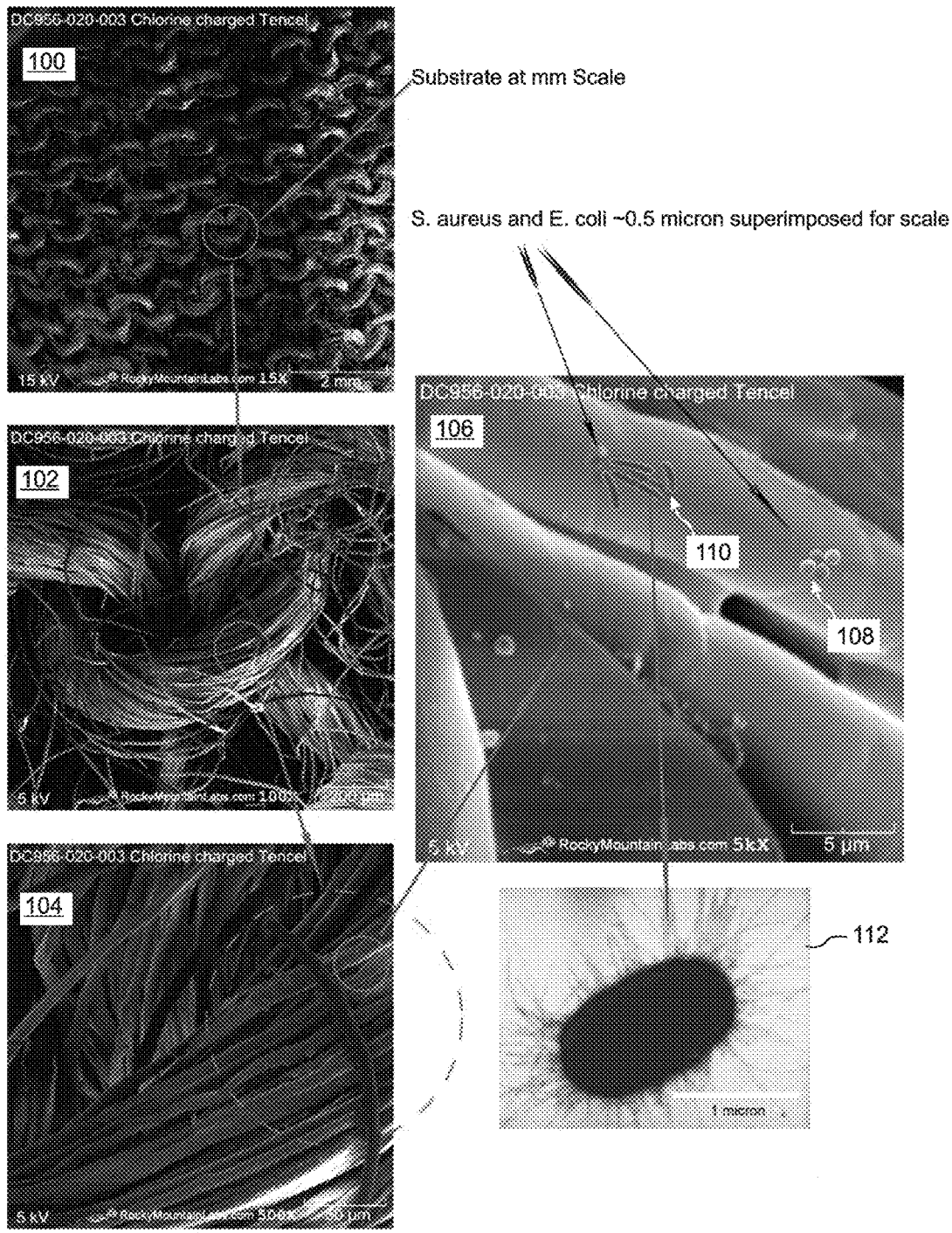
FIG. 1 is a group of illustrations showing functional scales for antimicrobial contact transfer, whereby *S. aureus* and *E. coli* bacteria are shown to scale superimposed over images of Tencel fibers at different magnifications.
Figure 2:
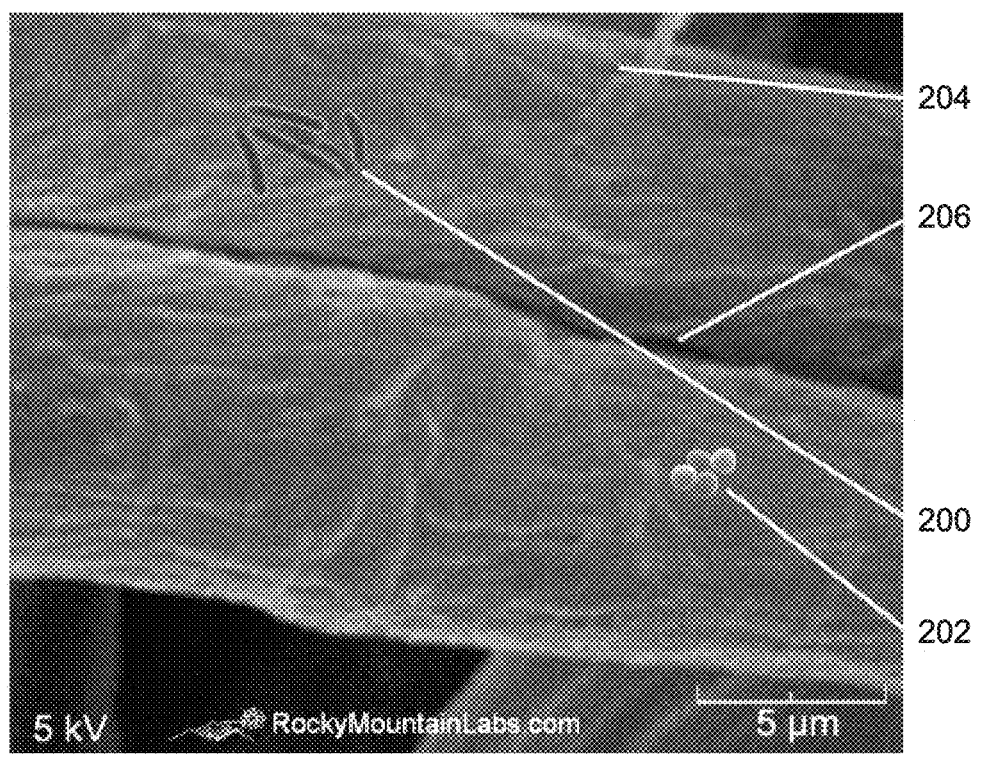
FIG. 2 is a group of illustrations in which *S. aureus* and *E. coli* bacteria are shown to scale superimposed over an image of Tencel fibers, showing the potential for interaction at the scale of roughness found in the fiber filaments.

The consistent coverage without gaps or windows is critical because of the scale of bio-pathogens, as can be seen in FIGS. 1 and 2. The reference bacteria in the figures are on the order of 0.5 micron in diameter, and the defects in the coating must be rare on this scale.

FIG. 1 presents a group of illustrations showing functional scales for antimicrobial contact transfer, showing a Tencel substrate at different magnifications, where the overall substrate is visible at 15× magnification 100, yarn bundle groups at 100× magnification 102, and individual filaments at 500× magnification 104. An additional image 106 compares the Tencel substrate with superimposed images of S. aureus 108 and E. coli 110 bacteria at 5,000× magnification 108. Note that the fimbria visible in the enlarged E. coli image 112 are fibrous appendages which are part of the attach mechanism of E coli and staph.

FIG. 2 presents images of E. coli 200 and S. aureus 202 superimposed to scale onto an image of cotton fibers 204 taken at 5000× magnification. The approximate scale of the S. Aureus and E. coli bacteria superimposed on the cotton filament surface. This shows the potential for interaction at the scale of roughness found on fiber filaments.

As can be seen in FIG. 2, the typical central crease 206 in the cotton filament must be coated, since it is of the appropriate scale to permit bacterial transfer if the biocide is not continuous over these areas.

In various embodiments, the anti-pathogen coating can include any of a number of compounds. In some embodiments, the anti-pathogen coating includes a halogen-based biocide, which can be a halogenated N-cyclic such as hydantoin or DMDMH with a halogen charge, halogen-charged glycoluril, quaternary ammonium salts, and/or other compounds.

Using the contact transfer test protocol (CTTP), we have been able to demonstrate novel anti-pathogen transfer control performance, whereby the biocide is capable of inactivating between 97% and 99.9999% of the bio-pathogen in 90 seconds.

Fiber Filament Surface Energy

The selection and processing of the fiber type is important to the control of the surface energy of the structure. Embodiments of the present invention make use of cellulosic fibers for highly antimicrobial surfaces. These fibers are polar and have hydroxylated surfaces which are generally high in energy. The higher the surface energy of the fiber surface, the more it improves the attachment of the biological surface of the pathogens. In addition, the higher energy, more polar fibers have superior attachment for the anti-microbial coatings, because the high energy and polarity of the surface provides strong attachment of the biocidal layer by Van der Waals attachment, and the hydroxy sites on the surfaces are ideal for hydrogen bonding of biocides such as halogenated anti-microbials, including halamine, halogenated N-cyclics, halogenated hydantoin, and halogenated DMDMH.

Figure 3:
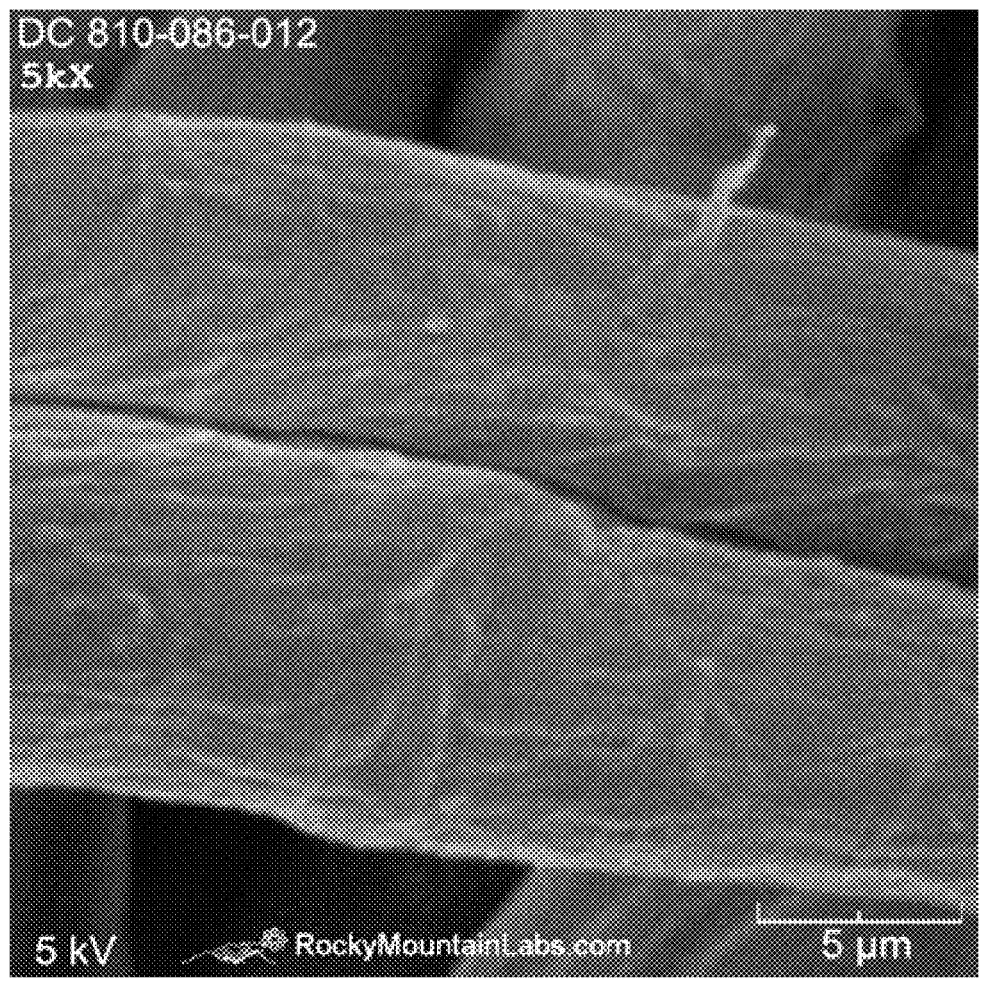
FIG. 3 is a magnified image of a natural pima cotton fiber.
Figure 4:
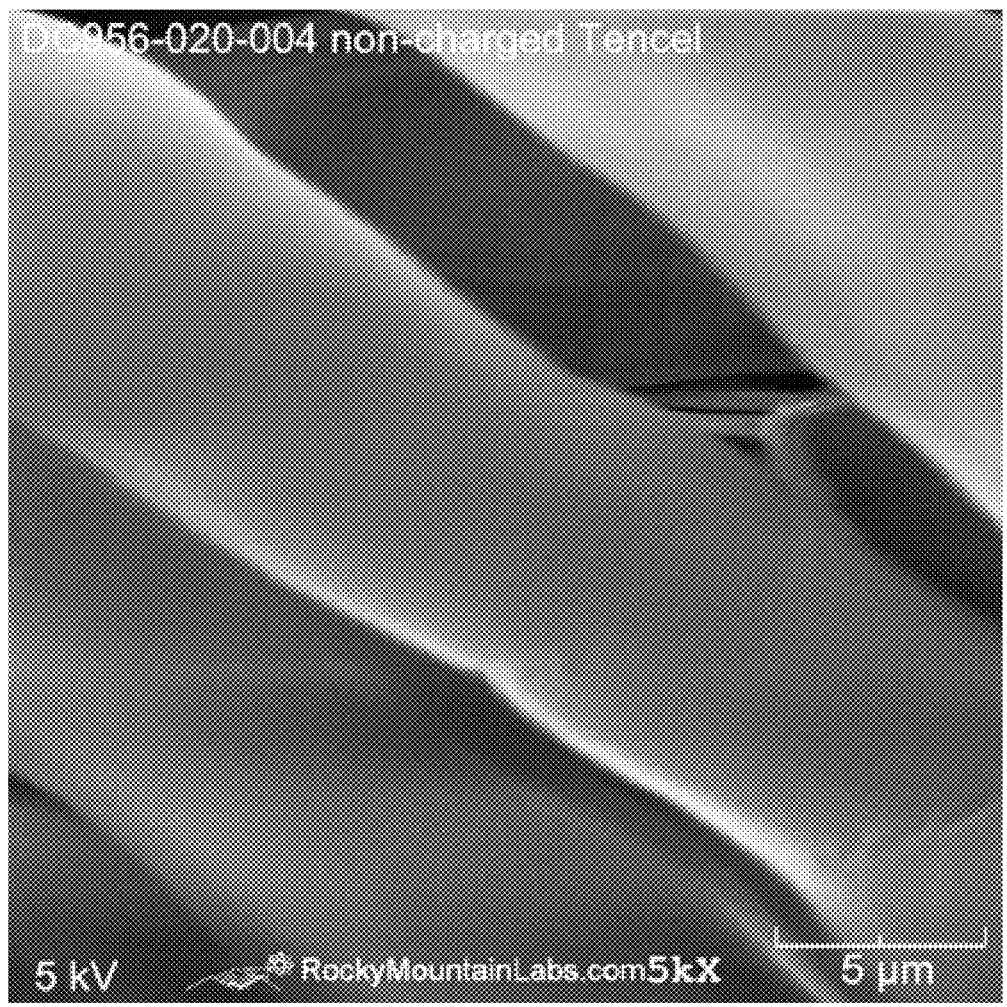
FIG. 4 is a magnified image of a Tencel fiber, shown at the same magnification as FIG. 3.

With reference to FIGS. 3 and 4, in embodiments the invention makes use of sythentic cellulosics, because they have higher surface energy than natural cellulosics such as the pima cotton fiber shown at 5000× magnification in FIG. 3. With reference to FIG. 4, also shown at 5000× magnification, Tencel, a rayon-like cellulosic produced by Lensing, has a clean surface energy of greater than 60 mJ/m² considerably higher than pima cotton. Some fibers listed in a representative ascending order of surface energy are Polyester, Nylon, Cotton, Nitro-cellulose, viscose, and Lyocell (Tencel).

In embodiments the substrate has a surface energy measured by the Washburn method before coating of about approximately 68 mJ/m² and a surface energy after coating and charging as measured by the Washburn method of at least 60 mJ/m².

The use of lyocell-type reconstituted cellulose fiber offers two benefits. First, the Tencel type has a smooth, round cross section with a Sa of less than 0.02 microns, which is much smoother than a typical pima cotton with a Sa roughness greater than 0.09 microns. Second, Lyocell has significantly higher surface energy as compared with cotton. This surface energy benefit is sustained after charge with chlorine and represents an approximately 50% increase over natural cotton. Based on general experience with wetting and the range of possible surface energy levels, the Lyocell type surface will generate significantly better wetting to the pathogen than either cotton or nylon materials.

TABLE 1

Table of representative Washburn surface energy data of Nylon, pima cotton and Tencel LF

| Sample Charged samples >5000 ppm tritratable cl | Overall Energy (mJ/m²) | Disperse Comp. (mJ/m²) | Acidic Comp. (mJ/m²) | Basic Comp. (mJ/m²) | Surface Polarity (%) | Base Ratio |
|---|---|---|---|---|---|---|
| DC438-462 Not Charged Nylon | 45.75 | 36.58 | 3.50 | 5.66 | 20.03 | 1.62 |
| DC966-009-054 Charged Cotton | 39.30 | 30.30 | 1.32 | 7.68 | 22.90 | 5.83 |
| DC956-020-001 Not Charged Cotton | 49.59 | 35.88 | 5.65 | 8.07 | 27.66 | 1.43 |
| DC956-018-002 Charged Tencel LF | 60.59 | 41.61 | 1.99 | 16.99 | 31.33 | 8.52 |
| DC956-020-002 Not Charged Tencel | 68.34 | 44.91 | 5.54 | 17.89 | 34.29 | 3.23 |

In embodiments, the structure described above is combined with at least one additional textile element of a different type than the clean OH functionalized celulosic surface. This element has controlled coating attachment, and therefore a controlled charge. This is discussed in more detail below in reference to multi-layer fabric embodiments.

Surface Roughness

Figure 5:
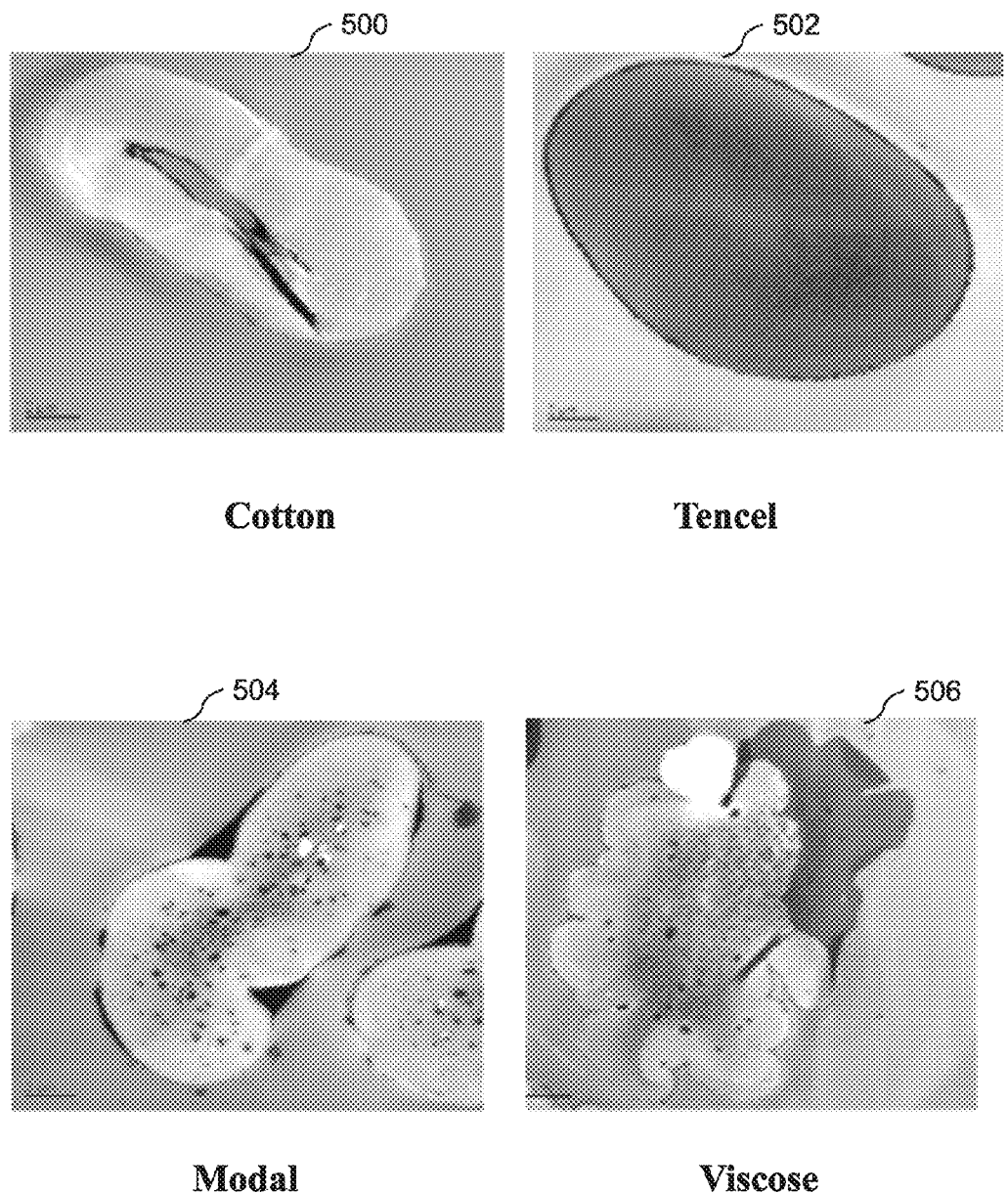
FIG. 5 is a series of cross-sectional images of four different fiber types.

In addition to surface energy the surface morphology of the substrate is significant to the invention. FIG. 5 illustrates the family of cellulosic fiber types, including cotton 500, Tencel 502, Modal 504, and Viscose 506. These micrographs by Lenzing show the cross sections of the important types of natural and reconstituted fibers. These images also suggest the surface morphology and surface roughness of these fibers.

The invention makes use of novel competing interfacial effects provided by smooth synthetic cellulosic filaments. It has been shown in dental studies that the level of roughness is a significant factor in bacterial attachment (see "The influence of surface free energy and surface roughness on early plaque formation" By: Quirynen M., Marechal M., Busscher H. J., J. Clin Periodontol 17:138-44, 1990). It has been demonstrated that the low roughness of these very smooth filaments limits the pickup of bio-pathogens in contact transfer. Lower loading of bio-pathogens reduces the quantity of CFUs that must be inactivated. The high energy of the surface is less significant in the pickup of bio-pathogens when compared to the roughness of the filament.

Figure 6A:
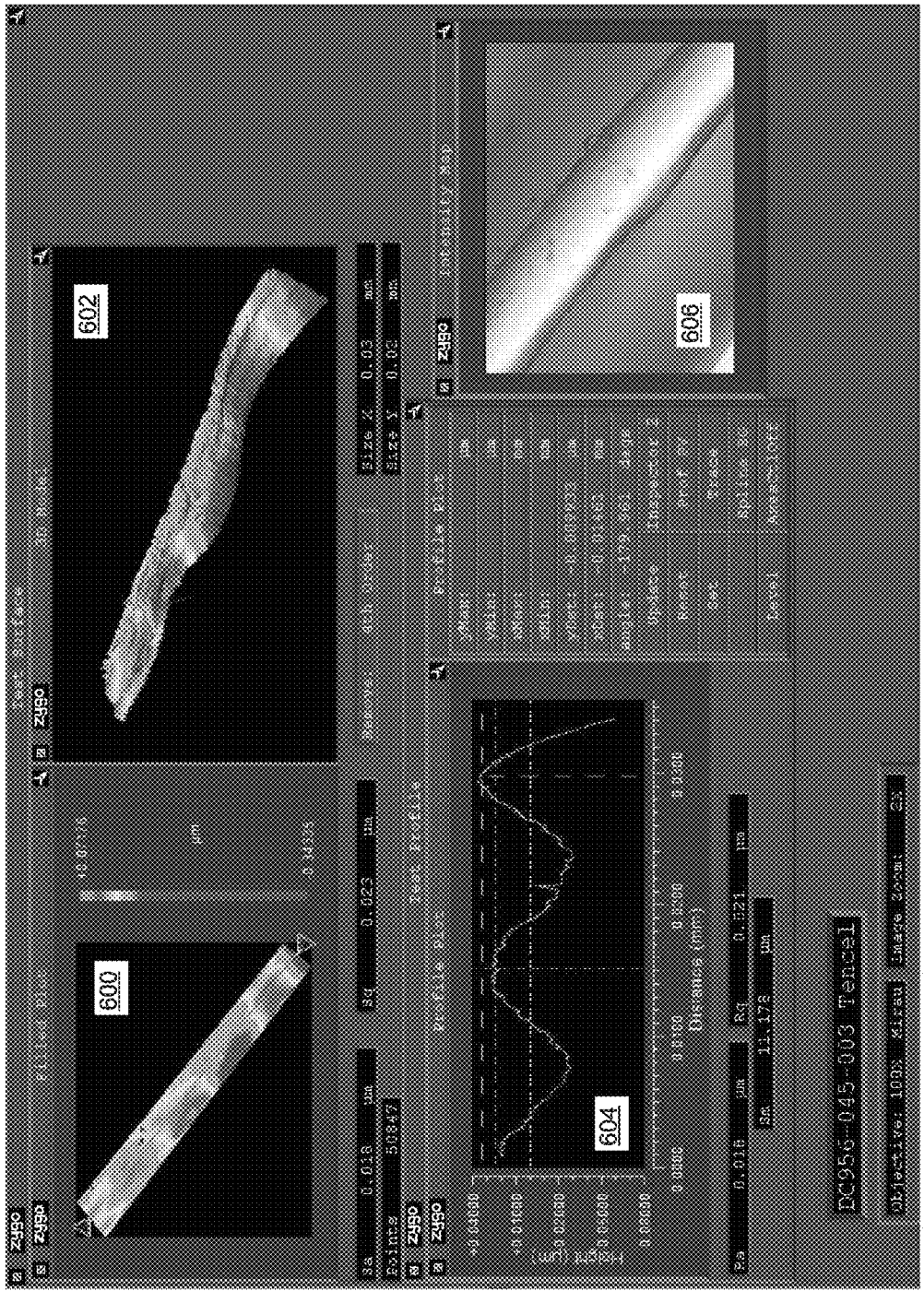
FIG. 6A presents roughness measurement data for Tencel.
Figure 6B:
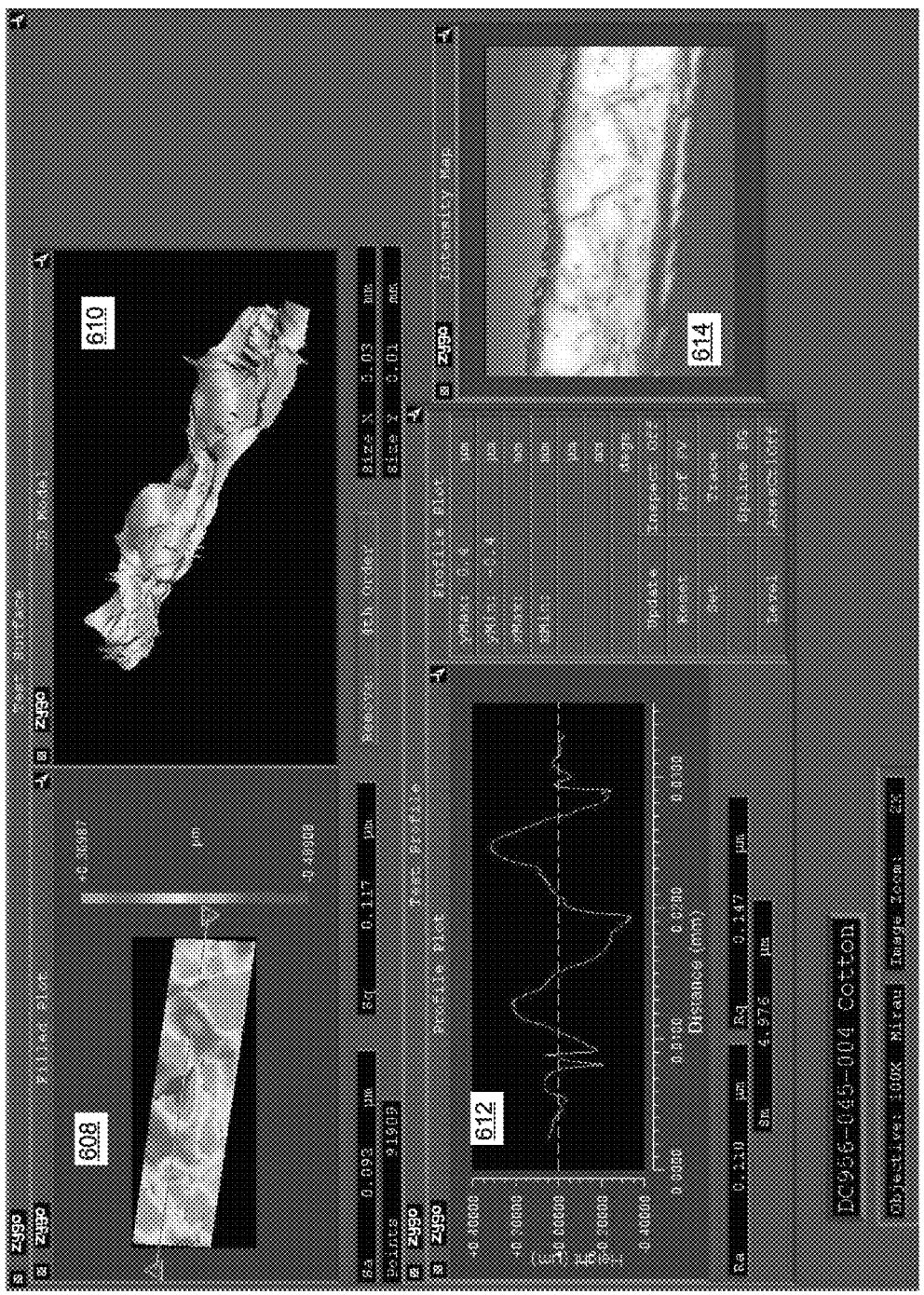
FIG. 6B presents roughness measurement data for cotton.

FIG. 6A presents a detailed roughness analysis of Tencel, including a filled plot 600, a 3D model 602, a profile plot 604, and an intensity map 606. FIG. 6B presents a detailed analysis of cotton, also including a filled plot 608, a 3D model 610, a profile plot 612, and an intensity map 614. Note that the roughness of cotton (0.092 microns) is five times the roughness of Tencel (0.018 microns) using the Sa term for average roughness.

Some transfer pickup of pathogens results even on smooth filaments. As a result of the high surface energy of the filament surface these bio-pathogens wet to the surface and are in intimate contact with the antimicrobial coatings. This sequence is as follows:

- Smooth filament surfaces limit bio-pathogen pickup from transfer surfaces
- High filament surface energy results in wetting of the pathogen and intimate contact
- High density, anti-microbial coatings with fast inactivation kinetics limit the final transfer of viable pathogen CFUs.

TABLE 2

Table of Transfer Pickup of Bio-pathogens on controlled test surfaces without antimicrobial

| Sample type | Example# | Pathogen | Transfer method | Challenge CFUs on Initial Contact Petri Dish | CFUs Transferred by Control Samples |
|---|---|---|---|---|---|
| Pig skin (prepared) | E#1 | E. coli | CTTP | 5.57E+07 | 5.97E+03 |
| Cotton knit | E#2 | E. coli | CTTP | 5.57E+07 | 8.22E+02 |
| Tencel knit | E#3 | E. coli | CTTP | 5.57E+07 | 2.08E+02 |
| Pig skin (prepared) | E#1 | S. aureus | CTTP | 3.11E+06 | 1.21E+03 |
| Cotton knit | E#2 | S. aureus | CTTP | 3.11E+06 | 7.23E+02 |
| Tencel knit | E#3 | S. aureus | CTTP | 3.11E+06 | 3.64E+02 |

Yarn Bundle

Figure 8:
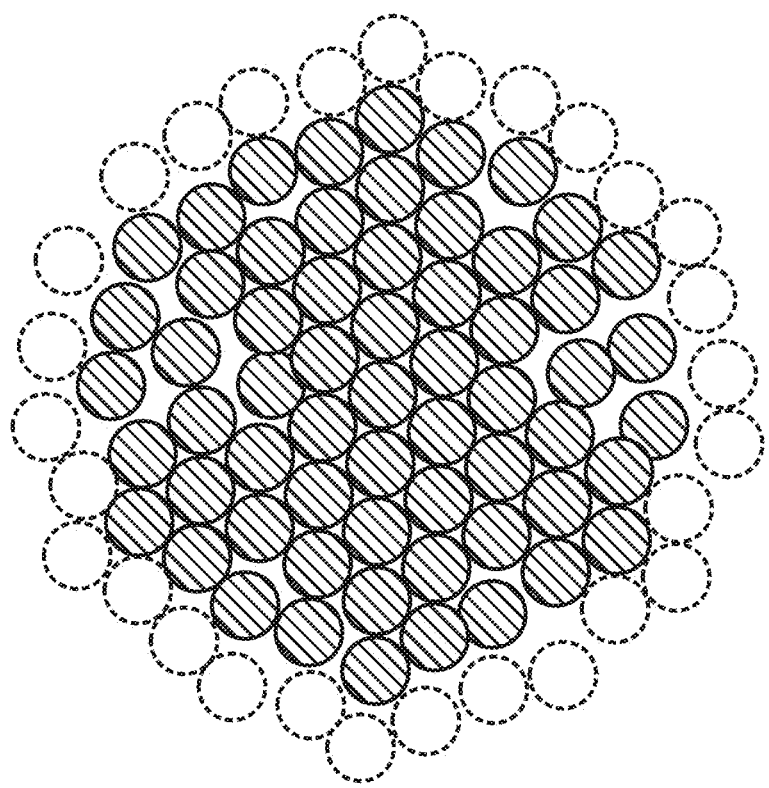
FIG. 8 is an illustration of an 87 cotton count fiber bundle.
Figure 7:
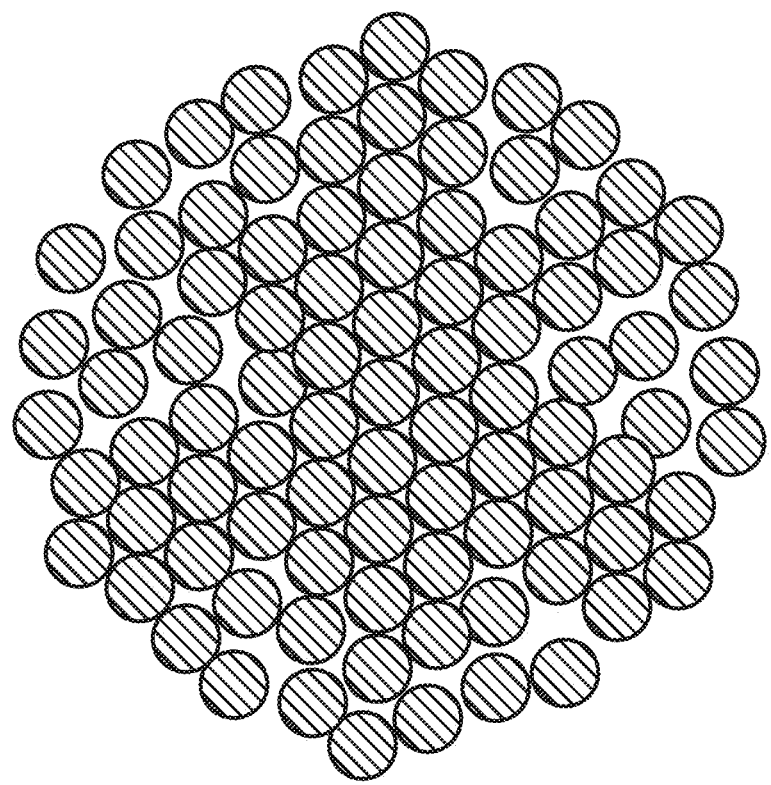
FIG. 7 is an illustration of a 65 cotton count fiber bundle.

With reference to FIGS. 7 and 8, in embodiments single yarn bundles of less than 1000 d denier are used. In some embodiments single yarn bundles less 300 d are used and in certain embodiments singles yarns of less than 200 d denier are used. In some embodiments the yarn bundle has a twist multiple of below 3.9 and in other embodiments the yarn bundle has a twist multiple of below 3.5, depending on the tensile requirements of the textile. In certain embodiments the filament percentage in the outer surface of the yarn bundle is above 20%.

FIG. 7 is a cross-sectional illustration of 65 cotton count with approximately 90 filaments per yarn bundle and with approximately 31% of the yarn area in the first ring of the filaments. FIG. 8 is a cross-sectional illustration of 87 cotton count with approximately 60 filaments per yarn bundle and with approximately 40% of the yarn area in the first ring of filaments.

Substrate

In the present invention, to optimize scour, antimicrobial coating, and charging, the textile substrate is of an open structure. Embodiments include substrate constructions of greater than 30 yarns/inch in the machine direction and greater than 30 yarns per inch in the cross machine direction. The preferred textile has an Air Permeability tested by ASTM D737 of greater than 400 cfm/ft$^2$.

In various embodiments this is achieved using wovens, knits, or non-woven substrates. In addition, in some embodiments a second fiber can be used to create a substrate with differential antimicrobial and comfort features. This is discussed in more detail below with reference to multi-layer fabric embodiments.

Scour Processes

The near-complete elimination of surface contaminates is central to the present invention. Coatings are applied in embodiments of the present invention which have a thickness of less than 1.0 microns, with little or no bridging to adjacent filaments. The fiber, film or substrate must be free of contaminates and wax, or a cleaning or "scouring" process must be used to remove any contamination prior to the coating process. For high performance anti-pathogens, the coating must be substantialy continous and consistent over the filaments in the yarn bundle or other substrate surface. The present invention provides an absence of coating defects which might otherwise result from a range of effects, such as the use of high surfactant emulsion loading. This absence of coating defects in the present invention results in part from avoiding the following sources of defects:

a) Sub-optimal wetting between coating liquor and substrate surface;
b) Variable surface scour cleaning;
c) Tension induced liquor exclusion from internal fiber bundle surfaces;
d) Inadequate agitation during coating;
e) High yarn twist;
f) Large filament bundles; and
g) Excessive tightness in the fabric assembly.

Surface defects in the coating resulting from any of the sources listed above have two effects. First, they reduce the average antimicrobial coverage, and second, they create zones of distance between attached pathogens and antimicrobial material. The very tight control of the coating process in the present invention results in very fast inactivation times for pathogens, because the present invention provides a very high degree of biocide coating film integrity.

In the case of a typical cotton fiber, the cotton wax and pectin components in the cell structure are low energy components which limit the performance of the cotton with regard to coating compatibility and bio attachment of pathogens. Even with complex enzymatic scour processes, these lower energy components of the cotton cannot be eliminated. Fully reconstituted forms of cellulose do not have these surface components. Reconstituted cellulosic fibers require a spin finish for processing, in common with other fibers. These lubricants and antistatic finishes can be effectively scoured off the fabric, if considerable care is taken with the chemistry of the scour process.

Following are two scour processes included in embodiments of the present invention.

Scour Process #1 (Range Scour)

Scour finishes removal step with liquor ratio between 2:1 and 5:1 (liquor to wet goods) operated at temperature 25-60° C. at a pH of 7-11 and a combination of anionic surfactants and detergents resulting surface energy for cotton less than 40 mJ/m$^2$ calculated using the Washburn method. Web feed rate is 3-15 ypm. Rinse is 3-7 steps at 25-60° C. and has a liquor ratio of between 2:1 and 5:1, extraction is done by vacuum >10 iwg, leaving a methanol extractable limit of less than 1% by weight using ASTM D2257-2004 Soxhlet extraction.

Scour Process #2 (High Performance Piece or Garment Process)

Scour finishes removal step with liquor ratio 5:1 (liquor to wet goods) operated at temperature 60° C. at a pH of 10 and a combination of anionic surfactants and detergents resulting in a surface energy of between 60 and 68 mJ/m$^2$ calculated using the Washburn method. Agitation is used for 40 min, with zero tension and using a piece or garment process permitting both cross machine and machine direction compression of the fiber bundles. Water used is demineralized. Rinse is 3 steps at 60° C. and has a liquor ratio of 5:1 (liquor to wet goods). Extraction is done at 300 g's, leaving a methanol extractable limit of less than 0.3% by weight using ASTM D2257-2004 Soxhlet extraction.

Low Tension, High Agitation Coating Process

The anti-pathogen coating process in embodiments of the present invention includes novel features in both the coating formulation and the coating application. In general, organic solvent-based coatings have been restricted in use as a result of the environmental controls that are required. The widely used alternative to organic solvents is the use of aqueous emulsions based on surfactants. This surfactant emulsion approach is the typical method used for antimicrobial coating formulations. However, this approach is not used in the creation of the high surface energy anti-pathogen coatings of the present invention. If a surfactant were used in the coating, it would result in surfactant being trapped in the coated film, and would thereby result in reduced coating consistency and lower surface energy.

In addition to novel coating materials, a special coating process is included in embodiments of the present invention. In particular, embodiments of the present invention avoid the use of continuous coating methods, which could cause limitation of the internals of the fiber bundles. Exposure times to the coating bath, tension levels and agitation would not be optimized in continuous processing. In embodiments of the present invention, special piece or garment coating processes are used. Embodiments include contact times with the coating bath of greater than 10 minutes, including continuous agitation with zero tension on the yarn bundles. Various embodiments include jet processing with 50-100 g's of rotational acceleration while coating liquor is being sprayed on the textile surfaces. The various embodiments of the present invention allow for intimate contact between coating and fiber bundles during this extended processing providing high coating durability through non-covalent hydrogen bonding and/or Van der Waals attachment mechanisms.

In certain embodiments, agitation of the charging bath permits diffusion of the halogen into the thickness of the coating, including obscured surfaces interior to the filament bundle, and provides mechanical manipulation of the untensioned filament bundle during coating application. This combination produces a more continuous coating throughout the yarn bundle and around each filament.

Figure 9:
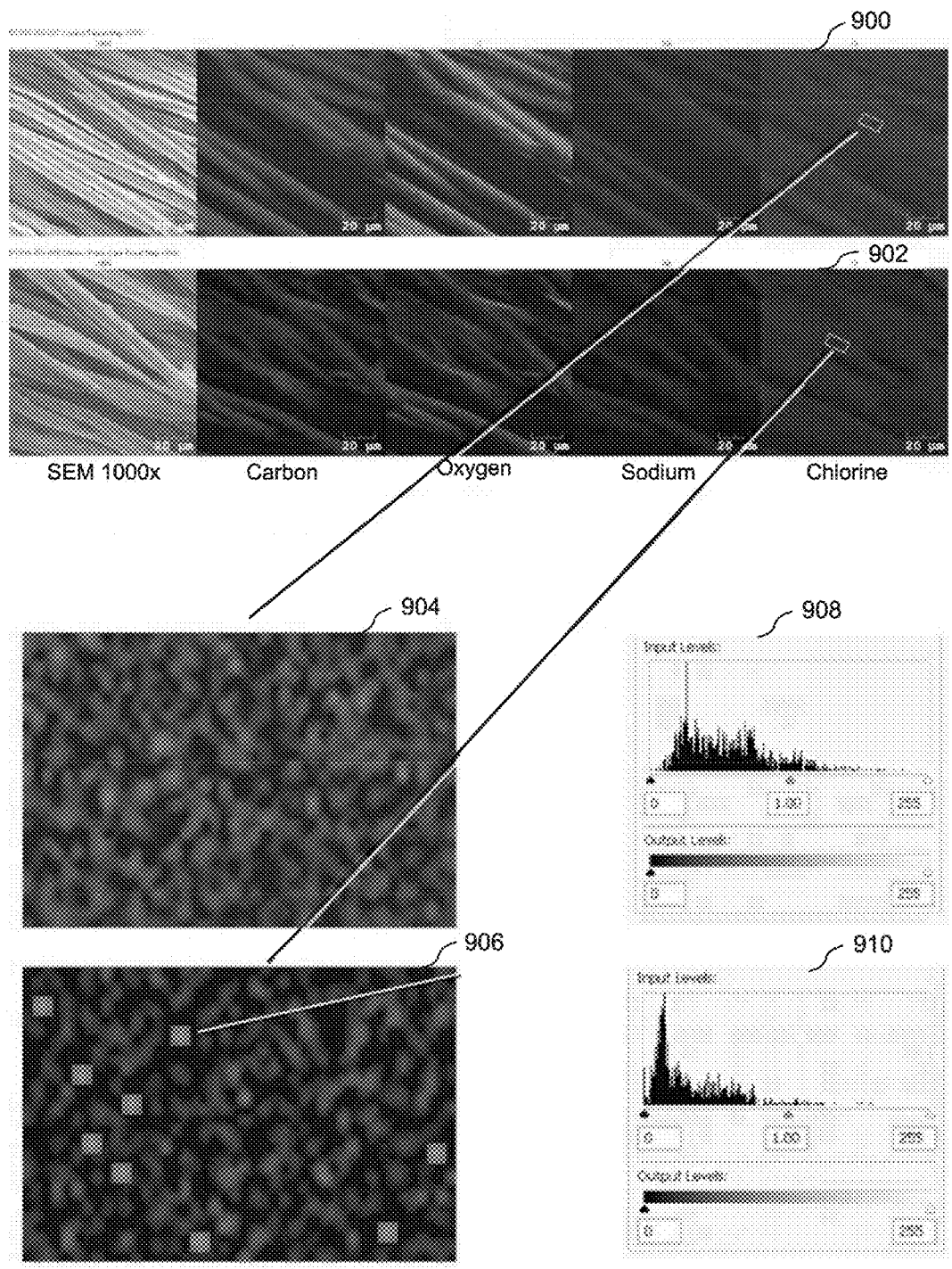
FIG. 9 compares EDK maps of chlorine distribution on the surfaces of Tencel and cotton fibers at 1000× magnification.

With reference to FIG. 9, the use of Energy-Dispersive X-ray spectroscopy (EDX) permits the analysis of the continuity of the surface coating. This is accomplished by analyzing the chlorine content of the substrate surface. The EDX system integrates a small zone on the target. By evaluation of the fiber or substrate surface with an EDX probe the chlorine content by sample can be plotted to provide a measure of coating consistency. In embodiments, the coating process of this invention has an EDX determined coating consistency of fewer than 1 coating gap of 1 $\mu m^2$ in extent per 30 $\mu m^2$, and in some embodiments fewer than 1 coating gap per 150 $\mu m^2$, which is a much higher consistency than the current state of the art in antimicrobial treatments.

FIG. 9 compares EDX Chlorine maps at a 20 micron scale for cotton (Clorox brand fresh care towel cotton) 900 and Tencel (Warwick coated) 902. Also included are a Tencel chlorine map of single filaments showing continuous coverage at the 0.5 micron scale 904, and a cotton chlorine map showing 1 micron gaps 906, where the indicated green boxes are scaled to approximately 0.5 microns to estimate the coating spaces large enough to allow bacteria space without contact with the biocide. Also included are histograms of chlorine values from samples showing spread of coverage on Tencel 908 and gaps in cotton coating cover 910. Note the 1.0 $\mu m$ gaps in the commercially coated cotton, and the lack of gaps in the tencel prepared according to the present invention.

Anti-Pathogen Charging Process

In embodiments, the anti-pathogen compound is of an active disassociating type. Embodiments use N-halamines, and some embodiments use N-cyclics such as DMDMH and/or hydantoins, which provide this type of highly active disassociating chemistry. In some embodiments, the CMDH and/or DMDMH imide system is used. It has been shown that the antimicrobial effectivenesses of N-halamines are in the following order: imide>amide>amine halamines, which is in a reverse order of the bound halogen stability. See:

NTC Project: C05-CR01 1
"Hybrid Micro-porous Membranes Intended for Protective Clothing"
Project Team:
Leader: S. Kay Obendorf, Cornell University, textile chemistry
Members: Gang Sun, UC Davis, textile and polymer chemistry, functional materials.
National Textile Center Annual Report: November 2005

In embodiments, the anti-pathogen coating is a halogen coating which is charged with aqueous halogen to an exceptional level of halogen charge of 4000 ppm or greater. The use of DMDMH and/or hydantoin and/or glycoluril in some embodiments permits binding of halogen to these N-cyclic chemistries.

Following are several examples of charging methods used in embodiments of the present invention.

Example A

The basic method of charging and recharging of the anti-pathogen coating in embodiments of the present invention uses an aqueous solution of sodium hypochlorite (Clorox) with 200 ppm of titratable chlorine at ambient temperature, and with the fabric being maintained under low tension and under continuous agitation for 10-60 minutes of contact time, followed by extraction of the excess solution and rinsing and drying of the fabric.

Example B

In some embodiments, a 400 ppm aqueous solution of chlorine is prepared from gaseous chlorine and demineralized water. The pH of this solution is adjusted to between 4 and 6 by adding hydrochloric acid. The fabric is then processed according to the method of Example A.

Example C

In other embodiments, a 400 ppm aqueous solution of bromine is prepared from gaseous chlorine and demineralized water. The pH of this solution is adjusted to between 4 and 6 by adding hydrochloric acid. The fabric is then processed as in Example A.

Example D

In still other embodiments, a 200 ppm aqueous solution of bromine and 200 ppm of chlorine is prepared from gaseous chlorine and demineralized water. The pH of this solution is adjusted to between 4 and 6 by adding hydrochloric acid. The fabric is then processed as in Example A.

Example E

In yet other embodiments, the charging process is first applied according to one of the examples given above, after the wet fabric is suspended in a suitable enclosure and exposed to chlorine gas for 15 minutes.

Multi-Layer Fabrics

In order to get very fast inactivation times for control of contact transfer, the outer anti-pathogen (e.g. halogen) charge levels must be very high. Charge levels in embodiments are high enough to provide pathogen inactivation in less than 5 minutes, and in some embodiments in less than 2 minutes. At these levels of activity, the skin of the wearer can become sensitized.

In embodiments the present invention can provide this level of bio-pathogen control without concern about adverse affects on the wearer's skin. These embodiments address this concern by the creation of a fabric having a multi-layer structure, including an outer fiber layer that is capable of accepting an aggressive anti-pathogen coating and producing high pathogen inactivation rates, and an inner layer of fiber that contacts the wearer's skin and is configured to accept a lower intensity anti-microbial coating which is compatible with skin contact.

There are a number of approaches to the fabrication of a multilayer textile structure. The most widely used relates to weaving patterns that produce two faces of the textile that have warp and fill faces. The twill or sateen is most well-known pattern that has this property. In these constructions, the floats in the weave allow either the warp or the filling to dominate one side of the fabric. When two different yarn types are used in the warp and fill, the effect is to produce a two layer structure.

In the knitting process, a less well-known method is the use of plating, where two yarn types are fed to the knitting needles in such a way as to keep one yarn type on one side of the knit and the other yarn on the opposite side of the fabric.

The use of felts also makes non-woven textiles possible with two distinct layers. In this approach two layered webs formed of different fibers are combined by bonding or needling to form a single two layer web.

The Skin Side of the Substrate

In some multi-layer embodiments the outer and inner layers are not uniform in antimicrobial activity. In embodiments, the anti-pathogen coating is applied in a saturation mode with the fiber bundles at zero tension and mechanical action which compresses and spreads the filament bundles and the crossing points in the structure. While this coating method applies coating to all the surfaces of the textile, in embodiments the textile has a controlled acceptance of the coating. By engineering the fiber types on the two surfaces of the textile, the thickness and the coverage of the anti-microbial coating is controlled and varied.

The following table provides details applicable to an embodiment wherein the inner layer is textured PET fiber and the outer layer of the structure is a cellulosic fiber, such as rayon or Tencel filament fiber.

| Sample Type | Coating method | Anti-microbial | Titratable halogen | Test method | Inactivation time | Log inactivation |
|---|---|---|---|---|---|---|
| 1.5 oz Nomex Knit | Dip and pad | siloxane hydantoin-1 emulsion | 400-500 ppm | AATCC M100 | 1 hour | 1.5-2.5 |
| 60/2 cotton knit | Multi dip and agitate | siloxane hydantoin-3 ethanol | 2000-3000 ppm | AATCC M100 | 30 min | 5-6 |
| 60/2 cotton knit | Multi dip and agitate | siloxane hydantoin-3 ethanol | 4500-5500 ppm | AATCC M100 | 15 min | 2-3 |

TABLE 3

Table of inactivation and charge levels

| Material Type | Exposure Tme (sec) | Pathogen | Log Reduction Based on Tencel Control Comparison | Log Reduction Based on Pig Skin Control Comparison | Log Reduction Based on Contact Dish Concentration |
|---|---|---|---|---|---|
| Tencel | 90 | S. aureus | 0.49 | 1.47 | 4.34 |
| Tencel | 90 | S. aureus | 0.61 | 1.59 | 4.37 |
| Tencel | 90 | S. aureus | n/a | 1.78 | 3.46 |

TABLE 3-continued

Table of inactivation and charge levels

| Material Type | Exposure Tme (sec) | Pathogen | Log Reduction Based on Tencel Control Comparison | Log Reduction Based on Pig Skin Control Comparison | Log Reduction Based on Contact Dish Concentration |
|---|---|---|---|---|---|
| Tencel | 90 | S. aureus | n/a | 1.94 | 3.62 |
| Tencel | 90 | S. aureus | n/a | 2.20 | 3.88 |
| Tencel | 90 | S. aureus | n/a | 1.72 | 3.40 |

TABLE 4

CTTP Pathogen deactivation test results for S. aureus

| Material Type | Exposure Tme (sec) | Pathogen | Log Reduction Based on Tencel Control Comparison | Log Reduction Based on Pig Skin Control Comparison | Log Reduction Based on Contact Dish Concentration |
|---|---|---|---|---|---|
| Tencel | 90 | E. coli | 2.68 | 2.70 | 7.18 |
| Tencel | 90 | E. coli | 3.26 | 3.20 | 7.65 |
| Tencel | 90 | E. coli | 2.32 | 3.71 | 7.75 |
| Tencel | 90 | E. coli | 1.71 | 3.23 | 7.14 |

Table 5: CUP Pathogen Deactivation Test Results for *E. coli*

Control of the coating pickup and limitation of the charge eliminates the issues with charge and skin affects to the wearer. Dermatological studies on animal models have been performed with textiles treated and charged with the DMDMH system with limited titratable chlorine of between 200 ppm and 600 ppm. These studies show that at these lower halogen levels there is no skin irritation.

INTEGRATED EXAMPLES

Figure 10A:
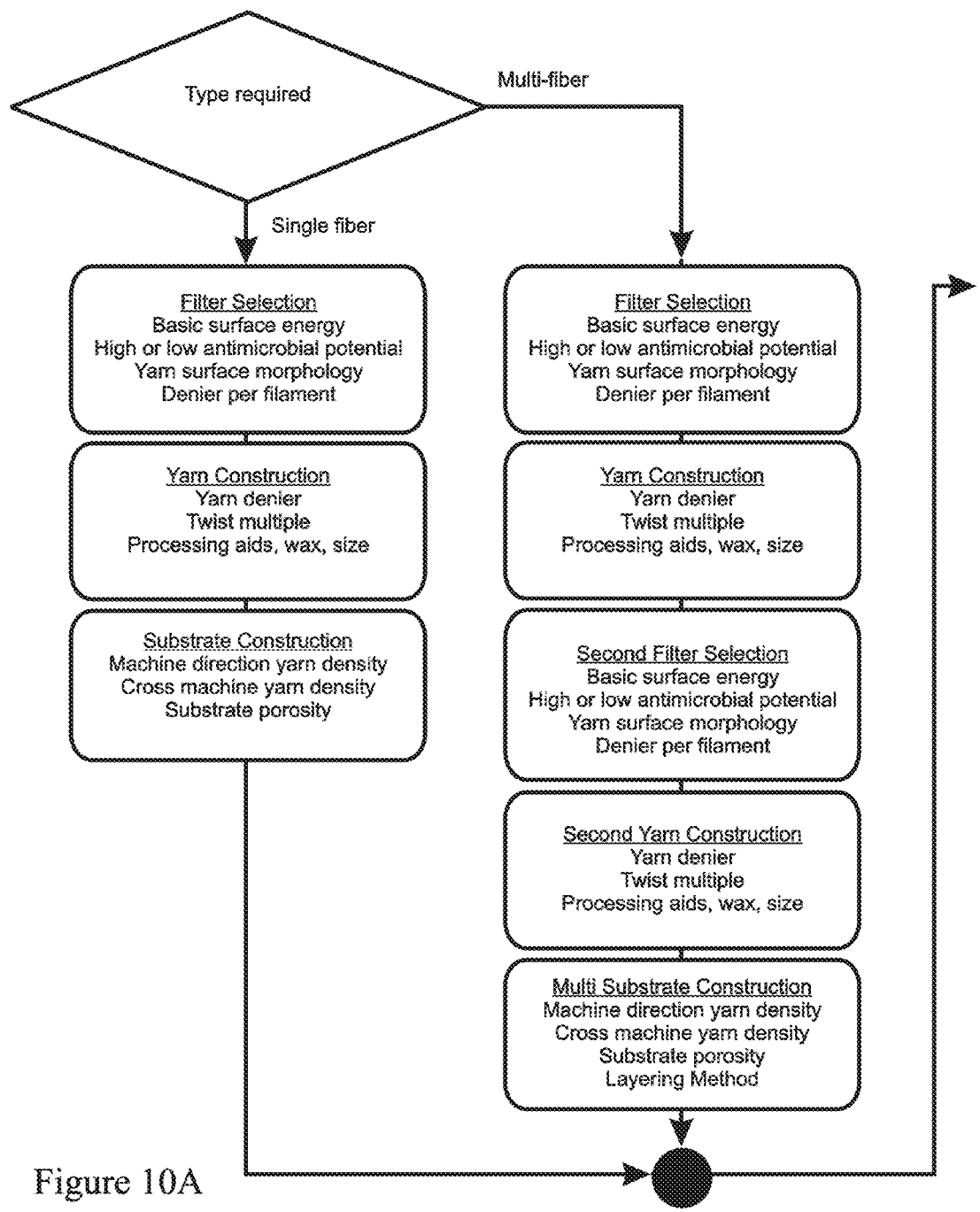
FIG. 10A is the first half of a functional diagram illustrating a method of an embodiment of the present invention.
Figure 10B:
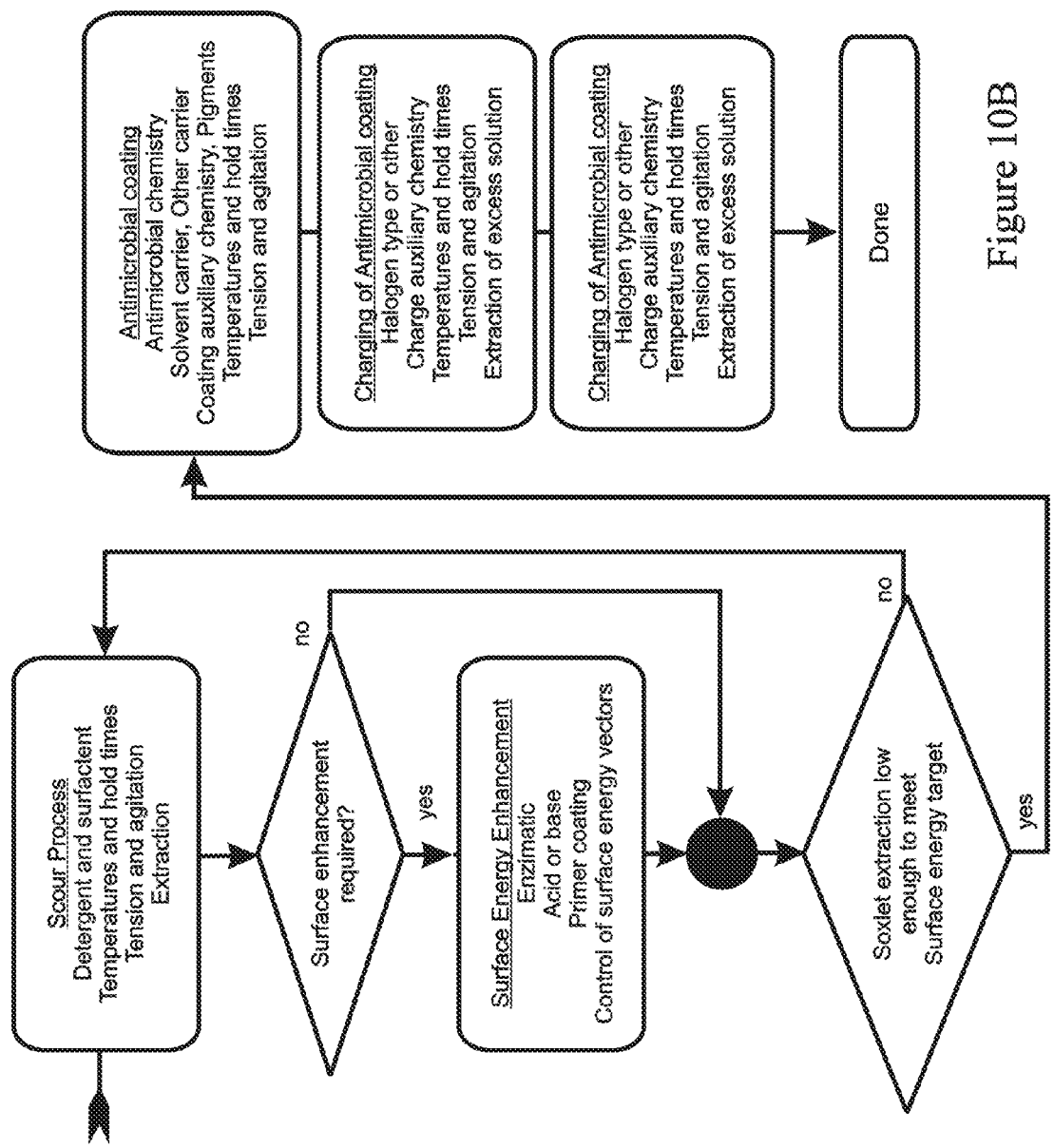
FIG. 10B is the second half of a functional diagram illustrating a method of an embodiment of the present invention.

FIGS. 10A and 10B present a functional diagram showing steps and decisions applicable to methods of creating self-decontaminating fabrics in embodiments of the present invention.

The following integrated examples are included in embodiments of the present invention.

System Example #1

DMDMH Hydantoin with engineered Tencel-Nylon bi-component substrate and advanced coating process showing the advanced pathogen surface attachment control and high C1 charge of 4000-5000 ppm for cellulose attach using Van der Waals bonding Scour per scour process #2

Substrate made from 30/1 or 177 denier Tencel fiber of 1.0 per filament of twist multiple of 3.5 per inch having approximately 177 filaments per cross section combined with a nylon yarn of 210 denier with 2.5 denier per filaments twisted to 6 turns per inch formed into substrate as a jersey knit at 15 courses per inch having a basis weight of 140 g/m$^2$, such that the nylon yarn is plated to one side of the structure.

Coating mixture made up of DMDMH hydantoin coating Glydant XL 1000 100% water of 5% solids, weight % of water of liquor ratio of 20:1 liquor to wet mass textile, knit saturated and agitated for 5 minutes in the coating. Extracted at 15 g's and having a wet pickup after extraction of 6.5% of dry weight, dried at 120° C. for 10 minutes in a forced air oven, curing at 150° C. for 5 minutes in a forced air oven.

Then rinsed in de-mineralized water for 15 minutes with agitation and extracted at 15 g's.

Charge per example a. The resulting coated, charged textile structure having a titratable C1 charge of between 4000 ppm and 5000 ppm.

This is the advanced process that as a result of the small yarns and the open structure and the advanced coating method and in combination with the filament cellulosic achieves adhesive control of the biological pathogen *S. aureus* and achieves AATCC M100 result at time x1 of log x2 reduction and a CTTP of 4.5 log at 90 seconds. Using the biological pathogen *S. enterica* results achieved of AATCC M100 result at time x1 of log x2 and a CTTP of 5.8 log at 90 seconds.

System Example #2

Example included in a basic embodiment: nylon monolayer construction with the basic coating process and 400-600 ppm results. SEMS and pickup data.

Scour per scour process #1

30 d nylon yarn of 13 filaments with 2.5 per filament of twist 0 turns per inch having approximately 13 filaments on in the outer most group formed into substrate formed into a rip-stop weave at 100 epi×100 epi having a basis weight of 30 g/m$^2$.

Coating mixture made up of siloxane hydantoin emulsion coating (Halosource BA-1 approximately 20% surfactant) in water of 5% solids, liquor ratio of 20:1 liquor to wet fabric mass. Textile saturated but not agitated for 1 minute in the coating. Extracted at 15 g's, dried at 70° C. in a forced air oven and curing at 137° C. for 2 minutes in a forced air oven. Then rinsed in de-mineralized water without agitation and extracted at 15 g's. Dry pick up 1-2% of dry weight.

Then charged per example A. The resulting coated, charged textile structure having a titratable chlorine charge of 100 ppm. Substituting cotton in this example would result in a chlorine charge of 500 ppm.

AATCC M100 result at time 24 hr of 3-6 log reduction.

Other industry and laboratory confirmation of charge levels less than 600 ppm:

Clorox brand incontinence pad produced under licence from Halosource has 400 ppm charge, confirming the results we achieved with the basic coating process.

Natick Solder center halamine coating of a rubber glove was unable to achieve these unexpected results.

Our own work on Nomex type 430 yarn resulted in 200-500 ppm

Air Force Research Lab (AFRL at Tindal) Coated and charged various fabric with are range of process methods and was able to achieve at most 600 ppm.

System Example #3

BA-N Siloxaine Hydantoin with engineered cotton substrate and advanced coating process high charge of 5000-6000 ppm with hydroxal cellulose bonding.

Scour per scour process #2

60/2 cotton yarn of pima fiber with an estimated denier per filament of approximately 1, having a twist multiple of 3.8 having approximately 88 filaments per cross section formed into substrate formed into a jersey knit at 18 courses per inch having a basis weight of 140 g/m$^2$.

Coating mixture made up of siloxane hydantoin coating (HaloSource BA-N) in 70% ethanol and 30% water of 14% solids, liquor ratio of 20:1 liquor to wet mass textile. Knit saturated and agitated for 5 minutes in the coating. Extracted at 15 g's and having a wet pickup after extraction of 17.5% of dry weight, dried at 80° C. for 25 minutes in a forced air and curing at 137° C. for 6 minutes in a forced air oven. Then rinsed in de-mineralized water for 15 minutes with agitation and extracted at 15 g's. Dry pick up 1.5% of dry weight Then charged per Example A. The resulting coated, charged textile structure having a titratable C1 charge of between 200 ppm and 400 ppm.

The resulting coated, charged textile structure having a titratable C1 charge of between 5000 ppm and 6000 ppm.

This advanced process, as a result of the small yarns and the open structure and the advanced coating method and in combination with the filament cellulosic, achieves adhesive control of biological pathogen.

System Example #4

DMDMH Hydantoin with engineered Tencel mono component substrate and advanced coating process showing the advanced pathogen surface attach control and high charge of between 5000 ppm and 6000 ppm for cellulose attach using Van der Waals bonding Scour per scour process #2

Substrate made from 30/1 or 177 denier Tencel fiber of 1.0 per filament of twist multiple of 3.5 per inch having approximately 177 filaments per cross section on in the outer most group formed into substrate formed into a jersey knit at 15 courses per inch having a basis weight of 70 g/$m^2$.

Coating mixture made up of DMDMH hydantoin coating Glydant XL1000 100% water of 5% solids, weight % of water of liquor ratio of 20:1 liquor to wet mass textile, knit saturated and agitated for 5 minutes in the coating. Extracted at 15 g's and having a wet pickup after extraction of 6.9% of dry weight, dried at 120° C. for 10 minutes in a forced air oven, curing at 150° C. for 5 minutes in a forced air oven. Then rinsed in de-mineralized water for 15 minutes with agitation and extracted at 15 g's.

Charge per example A. The resulting coated, charged textile structure having a titratable C1 charge of between 5000 ppm and 6000 ppm.

This is the advanced process that as a result of the small yarns and the open structure and the advanced coating method and in combination with the cellulosic filament achieves adhesive control of biological pathogen Ec according to AATCC M100 result at time x1 of log x2 reduction and a CTTP of 7.4 log at 90 seconds.

System Example #5

DMDMH Hydantoin with engineered Tencel-Nylon bi-component substrate and advanced coating process showing the advanced pathogen surface attachment control and high charge of greater than 2500 ppm for cellulose attachment using Van der Waals bonding Scour per scour process #2

Substrate made from 30/1 or 177 denier Tencel fiber of 1.0 per filament of twist multiple of 3.5 per inch having approximately 177 filaments per cross section combined with a nylon yarn of 210 denier with 2.5 denier per filaments twisted to 6 turns per inch formed into substrate as a jersey knit at 15 courses per inch having a basis weight of 140 g/$m^2$, such that the nylon yarn is plated to one side of the structure.

Coating and charging as in example #3

The resulting coated charged textile structure having a titratable C1 charge of greater than 2500 ppm.

System Example #6

Phenol Glycoluril engineered Tencel-Nylon bi-component substrate and advanced coating process showing the advanced pathogen surface attachment control and high charge of greater than 2500 ppm for cellulose attach using Van der Waals bonding Substrate per example #3

Scour per scour process #2

System Example #7

Ammonium Quatamarine non rechargeable biocide with bi-component substrate. The quaternary ammonium compound 3-(Trimethoxysilyl)-propyldimethyloctadecyl ammonium chloride (Si-QAC) has been found to have antimicrobial activity when covalently bonded to a surface.

Scour per scour process #2

System Example #8

Peptides non-rechargeable biocide with bicomponent substrate

Scour per scour process #2

Surface Measurement of Roughness Below 1 μm

Surface roughness can be evaluated by photometric methods under ISO method 25178. There are many measurement systems to characterize surface geometry. In the case of fibers the Sa or average roughness should include a correction for plain distortion by subtraction of the mean. In the preferred embodiment this a Sa of less than 0.045 μm.

Washburn Method

The Washburn technique was performed on 1"×1" squares of the textile material with n-hexane being used as the probe liquid. The important properties of the probe liquids for Washburn testing were as follows.

TABLE 4

Properties of probe liquids used for Washburn testing

| Liquid | Overall Surface Tension (mN/m) By Washburn method | Dispersive Comp. (mN/m) | Acidic Comp. (mN/m) | Basic Comp. (mN/m) | Density (g/cm$^3$) | Viscosity (cp) |
|---|---|---|---|---|---|---|
| Water | 72.8 | 26.4 | 23.2 | 23.2 | 0.998 | 1.00 |
| Diiodomethane | 50.8 | 50.8 | 0.00 | 0.00 | 3.325 | 2.76 |
| Formamide | 57.0 | 22.4 | 10.1 | 24.5 | 1.133 | 3.81 |
| Hexane | 18.4 | 18.4 | 0.0 | 0.0 | 0.661 | 0.33 |

Duplicate experiments on 1"×1" sections produced the raw data shown in the enclosed sample analysis report and resulted in the following contact angle values.

TABLE 5

Sample analysis Washburn Testing report

| Fabric | Run | Material Constant with Hexane (cm$^5$) | Contact Angle with Water (degrees) | Contact Angle with Diiodomethane (degrees) | Contact Angle with Formamide (degrees) |
|---|---|---|---|---|---|
| DC966-009-054 | 1 | 3.018 × 10$^{-6}$ | 72.8 | 56.9 | 65.0 |
| DC966-009-054 | 2 | 3.025 × 10$^{-6}$ | 72.7 | 57.1 | 64.9 |
| DC956-020-001 | 1 | 3.284 × 10$^{-6}$ | 57.5 | 47.1 | 43.6 |
| DC956-020-001 | 2 | 3.281 × 10$^{-6}$ | 57.6 | 47.0 | 43.5 |
| DC956-018-002 | 1 | 1.734 × 10$^{-6}$ | 50.0 | 35.8 | 39.0 |
| DC956-018-002 | 2 | 1.738 × 10$^{-6}$ | 50.0 | 35.9 | 39.2 |
| DC956-020-002 | 1 | 2.599 × 10$^{-6}$ | 35.2 | 28.2 | 6.5 |
| DC956-020-002 | 2 | 2.605 × 10$^{-6}$ | 35.1 | 28.4 | 6.6 |

Using the contact angle data obtained, as reported above, and the Van Oss theory, the following surface energy values can be calculated.

Issues with Microbiological Testing

The article "An Overview of Antimicrobial Testing for Textile Applications" By: H. Wayne Swofford, Microban International (AATCC Review November/December 2010 pp 51-55) the *AATCC Review* November/December 2010 provides a summary of the issues in antimicrobial testing. Following is an excerpt from the article.

"Antimicrobial treatment of textiles provides benefits in odor control and freshness, as well as protection against degradation due to bacteria and mold. However, differences in test results between laboratories and claims of performance through the use of unspecified and inappropriate test methods continually create confusion in the antimicrobial marketplace. The comparative information available on different antimicrobial technologies is often misleading due to differences in test methodologies, inappropriate methodologies, sometimes honest confusion in running methods, and differing levels of expertise. Just because two laboratories cite AATCC TM100 or JIS L 1902 does not mean that the laboratories are actually running those protocols in exactly the same way. The quality of testing is distressingly poor; in blind round robin testing less than half of the laboratories evaluated were capable of running a dependable quantitative test protocol. The only way to be sure of comparisons is by running tests side-by-side in the same laboratory with the same series of tests. Where differences occur between laboratories, only detailed review of the test protocol will enable one to understand results."

These testing issues are even more acute when poorly defined test methods are used to compare inactivation rates. There is some stabilization of results for longer test exposure times. The test protocol effects in short exposure time testing, exaggerate the inter-laboratory correlation issues.

Basic Saturation Anti-Microbial Test Methods

The AATCC method 100 and other listed Table 6 are all closely related tests and involve the inoculation of an ATS with a pathogen in a broth or other aqueous carrier. There is an inactivation time, typically of 1 hour to 24 hours, and then the pathogen is extracted and plated to a Petri dish, and the CFU are counted after a growth period. These methods are not suitable for evaluation of rapid inactivation of pathogens in contact transfer situations. In practice, the AATCC M100 has repeatability issues for rapid test times at less than 15 minutes.

These methods use a large saturating liquid challenge which is not representative of contact transfer. This very large challenge is motivated by the desire to have a test that is capable of measuring up to 6 log reduction in CFU counts. In the vast majority of actual contact transfer events the challenge is not sufficient to saturate the fiber bundles. Moreover the neutralization and liquid extraction steps in Method 100 do not permit the evaluation of the contact transfer. In these existing methods the pathogen is extracted not transferred. In order to evaluate contact transfer effectively we have accepted that the method will not have an extraction step and as a result the new method will not have greater than 3 log CFU count sensitivity.

Description of the Contact Transfer Test Process CTTP

In order to measure the interfacial behavior of contact pathogens we have developed a method that compares the pathogen transfer of an animal skin model to the candidate ATS materials. This method is based on the methods and concepts in EN1500 and EN1499 for effectiveness of hand gel and hand washing antimicrobials. These EN methods are skin transfer methods. We have adopted the use of an animal skin model to avoid the complexity of using human subjects.

CTTP

In the CTTP method we plate out a challenge of 30-41 onto a 100 mm agar dish. This challenge is a broth containing 1.5×10^8 CFUs/ml. The challenge volume is established for each organism based on the animal skin transfer baseline. This baseline CFU transfer must stay within countable limits on the transfer plate. The animal skin model is prepared from raw un-tanned pig skin with fat and bristle removed. Using a 15×80 mm pig skin samples the skin model is printed into the challenge biofilm with a contact load of 8 g/cm$^2$. Then using the same contact load the skin model is printed on the transfer agar dish. When testing for *Escherichia Coli*, MacConkey agar with Sorbitol (SMAC) is used, when testing for *Staphylococcus Aureus* Mannitol salt agar (MSA) is used. The same process is repeated for the antimicrobial treated samples and with witness samples that have no antimicrobial treatment. After 24 hour of incubation at 36 c the CFU counts are used to compare treated sample to untreated sample which provides data on the antimicrobial effect and the comparison of the skin model data to the untreated provides data on the surface energy and morphology effect. The skin model result compared to the treated sample provides data on the combined effect of both surface behavior and antimicrobial processes. In addition to these 3 comparisons the challenge plate is counted to ensure test consistency.

Titratable Halogen Testing

Halogen verification is achieved through the process of Iodometry. An Iodometric titration is run as a means to quantitatively represent the level of titratable chlorine on the surface of the textile. Swatch samples must be cut from the treated textile measuring at least 4 cm×4 cm, weighed and then placed into a 250 ml Erlenmeyer flask. Add 35 ml of 0.05N Sulfuric Acid ($H_2SO_4$) into the flask with the swatch sample. Then add 0.3 g of Potassium Iodide Powder (KI) into the flask. Using a magnetic stir bar and stir plate, allow samples to mix thoroughly as the solution becomes yellow. Using Sodium Thiosulfate ($Na_2S_2O_3$) standardized to a concentration of 0.001N, begin slowly allowing a steady drip by burette into the flask. Continue to add the $Na_2S_2O_3$ until most of the yellow color has dissipated. Once only a faint yellow coloration remains in the solution, add 5 drops of starch to act as an indicator, solution should turn blue. Continue to add $Na_2S_2O_3$ until blue coloration is no longer detectable. Record the final volume of the titrant, and the concentration of Chlorine present can be determined through the equation:

$$\text{ppm Chlorine} = \frac{(\text{mL of } Na_2S_2O_3)(.001)(35)(1000)}{(2)(\text{Weight of swatch})} \qquad (1)$$

Some of the standard tests which are applicable to the art of the present invention are presented in the following table from the AATCC Review article cited above.

TABLE 6

| \multicolumn{3}{c}{Standard tests which are applicable to the art of the present invention} | | |
|---|---|---|
| Agar plate tests, semi quantitative | Textile fabrics: Determination of the antibacterial activity | SN 195920-1992 |
| | Textile fabrics: Determination of the antimycotic activity | SN 195921-1992 |
| | Antifungal activity, assessment of textile materials: Mildew and rot resistance of textile materials | AATCC 30-1993 |
| | Antibacterial assessment of textile materials: Parallel streak methods | AATCC 147-1993 |
| | Antibacterial activity of fabrics, detection of | AATCC 90-1982 |
| | Antimicrobial activity assessment of carpets | AATCC 174-1993 |
| Challenge test, quantitative | Antibacterial finishes on textile fabrics, assessment of | AATCC 100-1993 |
| | Testing method for antibacterial textiles | JIS L 1902-1998 and -2002 |
| | Textile fabrics: Determination of the antibacterial activity: Germ count method | SN 195924-1983 |
| | Properties of textiles- Textiles and polymeric surfaces having antibacterial properties. Characterisation and measurement of antibacterial activity | XP G39-010-2000 |
| Dynamic shake flask test, quantitative | Testing methods for organic man-made fibres with antibacterial activity | BISFA booklet, 2002, chapter 4.4 |
| Fouling tests, soil burial tests | Methods of test for fungus resistance | JIS Z 2911-1992 |
| | Textiles- Determination of resistance of cellulose containing | ISO 11721-1-2001 |

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A fiber structure comprising:
   a polymeric substrate fiber layer having a total surface energy greater than 45 mJ/m$^2$; and
   an antimicrobial coating applied to a surface of the fiber layer, the antimicrobial coating having fewer than 1 coating gap of greater than 1 μm$^2$ in extent per 7 μm$^2$ of coated surface.

2. The fiber structure of claim 1, wherein the antimicrobial coating has no more than 1 coating gap of greater than 1 μm$^2$ per 30 μm$^2$ of coated surface.

3. The fiber structure of claim 1, wherein the antimicrobial coating has no more than 1 coating gap of greater than 1 μm$^2$ per 150 μm$^2$ of coated surface.

4. The fiber structure of claim 1, wherein the antimicrobial coating has a thickness of less than 1.0 microns.

5. The fiber structure of claim 1, wherein the antimicrobial coating is attached to the surface of the fiber layer by non-covalent attachment including at least one of hydrogen bonding and Van der Waals attachment.

6. The fiber structure of claim 1, wherein the fiber layer includes cellulosic filaments.

7. The fiber structure of claim 6, wherein the cellulosic filaments are synthetic cellulosic filaments.

8. The fiber structure of claim 7, wherein the synthetic cellulosic filaments include at least one of nitro-cellulose, viscose, and lyocell, and at least one other non-cellulosic fiber.

9. The fiber structure of claim 1, wherein the fiber layer includes single yarn bundles of less than 1000 d denier.

10. The fiber structure of claim 1, wherein the fiber layer includes single yarn bundles of less than 300 d denier.

11. The fiber structure of claim 1, wherein the fiber layer includes single yarn bundles of less than 200 d denier.

12. The fiber structure of claim 1, wherein the fiber layer includes yarn bundles with a twist multiple of below 3.9.

13. The fiber structure of claim 1, wherein the fiber layer includes yarn bundles with a twist multiple of below 3.5.

14. The fiber structure of claim 1, wherein the fiber layer includes yarn bundles having filament percentages in their outer surfaces above 20%.

15. The fiber structure of claim 1, wherein the fiber layer is constructed with a weave of more than 30 yarns per inch in a machine direction and more than 30 yarns per inch in a cross machine direction.

16. The fiber structure of claim 1, wherein the fiber layer has an air permeability tested by ASTM D737 of greater than 400 cfm/ft$^2$.

17. The fiber structure of claim 1, wherein the antimicrobial coating has a total coated average 2 dimensional roughness Sa of less than 0.5 of pima cotton.

18. The fiber structure of claim 1, wherein the antimicrobial coating includes at least one type of consumable halogen component having a total pathogen inactivation rating when compared to an animal skin model of greater than 1 log over a contact time of greater than 90 seconds.

19. A fiber structure comprising:
a polymeric substrate fiber layer having total surface energy greater than 45 mJ/m$^2$; and
a substantially uninterrupted antimicrobial coating attached to a surface of the fiber layer, the antimicrobial coating having a surface energy of greater than 40 mJ/m$^2$, the antimicrobial coating having a total coated average 2 dimensional roughness Sa of less than 0.5 of pima cotton.

20. The fiber structure of claim 19, wherein the antimicrobial coating has a total coated average 2 dimensional roughness Sa of less than 0.045 μm.

21. The fiber structure of claim 19, wherein the antimicrobial coating has a total coated average 2 dimensional roughness Sa of less than 0.02 μm.

22. The fiber structure of claim 19, wherein the antimicrobial coating is attached to the surface of the fiber layer by non-covalent attachment including at least one of hydrogen bonding and Van der Waals attachment.

23. The fiber structure of claim 19, wherein the fiber layer includes synthetic cellulosic filaments.

24. The fiber structure of claim 23, wherein the synthetic cellulosic filaments include at least one of nitro-cellulose, viscose, and lyocell, and at least one other non-cellulosic fiber.

25. A fiber structure comprising:
a cellulosic fiber layer having a surface energy measured by the Washburn method before coating of at least 45 mJ/m$^2$, and a surface energy after coating and charging as measured by the Washburn method of at least 40 mJ/m$^2$; and
an antimicrobial coating applied to a surface of the fiber layer, the antimicrobial coating including at least one type of consumable halogen component having a total pathogen inactivation rating when compared to an animal skin model of greater than 1 log over a contact time of greater than 90 seconds.

26. The fiber structure of claim 25, wherein the cellulosic fiber layer has a surface energy measured by the Washburn method before coating of about approximately 68 mJ/m$^2$ and a surface energy after coating and charging as measured by the Washburn method of at least 60 mJ/m$^2$.

27. The fiber structure of claim 25, wherein the consumable halogen component inlcues at least one of halamine, a halogen-charged N-cyclic, halogen-charged hydantoin, halogen-charged DMDMH, halogen-charged CMDH, and halogen-charged glycoluril.

28. The fiber structure of claim 25, wherein the antimicrobial coating is attached to the surface of the fiber layer by non-covalent attachment including at least one of hydrogen bonding and Van der Waals attachment.

29. The fiber structure of claim 25, wherein the consumable halogen component is chargable to a halogen charge of at least 4000 ppm.

30. The fiber structure of claim 25, wherein the consumable halogen component is chargable to a halogen charge of at least 5000 ppm.

31. The fiber structure of claim 25, wherein the consumable halogen component is chargable to a halogen charge of at least 6000 ppm.

32. The fiber structure of claim 25, wherein the antimicrobial coating is capable of inactivating at least 97% of a transferred bio-pathogen in 90 seconds as measured using the contact transfer test protocol (CTTP).

33. The fiber structure of claim 25, wherein the fiber structure is a multi-layer structure further comprising:
an inward facing polymeric substrate layer; and
an inner antimicrobial layer attached to a surface of the inward facing polymeric substrate layer, the inner antimicrobial layer being compatible with long term skin contact.

34. The garment of claim 33, wherein the inner anti-microbial layer includes a consumable halogen component that is chargeable with a halogen to a charge of no more than 600 ppm.

35. A method for producing a fabric structure including a polymeric substrate fiber layer having a total surface energy greater than 45 mJ/m$^2$ and an antimicrobial coating applied to a surface of the fiber layer, the antimicrobial coating having fewer than 1 coating gap of greater than 1 μm$^2$ in extent per 7 μm$^2$ of coated surface, the method comprising:
forming yarn bundles of less than 1000 d denier, the yarn bundles being bundles of polymeric filaments with twist multiples of less than 3.9;
scouring the yarn bundles at zero tension with applied agitation;
drying the yarn bundles using a non-continuous drying method at zero tension with applied agitation;
constructing a fiber layer from the dried yarn bundles with more than 30 yarns per inch in a machine direction and more than 30 yarns per inch in a cross machine direction; and
applying the anti-microbial coating to the fiber layer using a non-continuous batch process at zero fabric tension.

36. The method of claim 35, further comprising desizing the yarn bundles using multiple dip and pad passes through aqueous baths containing detergent and wetting components, followed by multiple rinse and pad steps to remove the contaminants solvated by the desizing chemistry.

37. The method of claim 36, wherein the level of residual contaminants after desizing and rinsing is less than 1% by weight of the textile.

38. The method of claim 35, wherein the antimicrobial coating is applied using a drum and paddle method that applies both zero tension and compressive mechanical action to the fiber layer.

39. The method of claim 35, wherein the antimicrobial coating is applied using a non-continuous coating process with greater than 10 minutes exposure.

40. The method of claim 35, wherein the antimicrobial coating is applied using jet processing with between 50 and 100 g's of rotational acceleration while a coating liquor is sprayed onto the surface of the fiber layer.

41. The method of claim 35, wherein the antimicrobial coating is attached to the surface of the fiber layer by non-covalent attachment including at least one of hydrogen bonding and Van der Waals attachment.

* * * * *

UNITED STATES PATENT AND TRADEMARK OFFICE
CERTIFICATE OF CORRECTION

PATENT NO. : 8,809,210 B2  
APPLICATION NO. : 13/507432  
DATED : August 19, 2014  
INVENTOR(S) : Charles A Howland Page 1 of 1

It is certified that error appears in the above-identified patent and that said Letters Patent is hereby corrected as shown below:

Specification

Detailed Description Section:
Column 16, first table should be labeled "Table 3: Table of Inactivation and Charge Levels" above the table.
Column 16, second table is labeled "Table 3" should be "Table 4: CTTP Pathogen Deactivation Test Results for S.aureus", please remove "Table of inactivation and charge levels" from the table.
Column 17, first table, labeled "Table 3-continued" should be labeled "Table 4-continued: CTTP Pathogen Deactivation Test Results for S.aureus", please remove "Table of inactivation and charge levels" from the table.
Column 17, second table, labeled "Table 4" should be labeled "Table 5: CTTP Pathogen Deactivation Test Results for E. Coli".
Column 17, Line 28, remove line "CUP Pathogen Deactivation Test Results for E. Coli".

Integrated Examples Section:
Column 21, first table, labeled "Table 4" should be labeled "Table 6".
Column 21, second table, labeled "Table 5" should be labeled "Table 7".
Column 22, Line 55 "30-41" should be "30-3µl".
Column 22, Line 5 should read: "The AATCC method 100 and other tests listed in Table 8 are all closely related tests".
Column 23, The table labeled "Table 6" should be labeled "Table 8".

Signed and Sealed this  
Tenth Day of November, 2015

Michelle K. Lee  
*Director of the United States Patent and Trademark Office*